US007005821B2

(12) United States Patent
Sunaga et al.

(10) Patent No.: US 7,005,821 B2
(45) Date of Patent: Feb. 28, 2006

(54) SERVOMOTOR CONTROLLER

(75) Inventors: Hideki Sunaga, Tokyo (JP); Futoshi Araki, Tokyo (JP); Kaoru Tanaka, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/848,849

(22) Filed: May 18, 2004

(65) Prior Publication Data

US 2004/0232872 A1 Nov. 25, 2004

(30) Foreign Application Priority Data

May 22, 2003 (JP) .............................. 2003-144550
May 23, 2003 (JP) .............................. 2003-146677

(51) Int. Cl.
G05B 11/18 (2006.01)
G05B 19/29 (2006.01)
B60H 1/00 (2006.01)

(52) U.S. Cl. ...................... 318/594; 318/602; 318/562; 454/69; 454/75; 700/278; 236/13; 236/49.3; 165/42; 165/202

(58) Field of Classification Search ................ 318/254, 318/295, 479, 561, 567, 568.1, 599, 601, 318/663; 236/13, 49.3; 454/69, 75; 700/83, 700/278; 165/42, 202
See application file for complete search history.

(56) References Cited

U.S. PATENT DOCUMENTS

| 4,264,849 | A | * | 4/1981 | Fleischer et al. ........ 318/568.1 |
| 4,275,676 | A | * | 6/1981 | Baba ...................... 114/144 E |
| 4,276,640 | A | * | 6/1981 | McNamee et al. .......... 370/360 |
| 4,328,855 | A | * | 5/1982 | Iwata et al. ................. 165/202 |
| 4,358,936 | A | * | 11/1982 | Ito et al. ........................ 62/229 |
| 4,365,663 | A | * | 12/1982 | Inoue et al. ................. 165/202 |
| 4,381,074 | A | * | 4/1983 | Iijima et al. .................. 236/13 |
| 4,386,397 | A | * | 5/1983 | Saeki ........................... 700/52 |
| 4,391,320 | A | * | 7/1983 | Inoue et al. ................. 165/204 |
| 4,473,786 | A | * | 9/1984 | Miyashita et al. .......... 318/561 |
| 4,549,125 | A | * | 10/1985 | Sonobe ....................... 318/663 |
| 4,640,183 | A | * | 2/1987 | Doi .............................. 454/75 |
| 4,974,776 | A | * | 12/1990 | Oshizawa .................... 236/13 |
| 5,043,642 | A | * | 8/1991 | Ohi ............................ 318/254 |
| 5,050,795 | A | * | 9/1991 | Knittel ........................ 236/13 |
| 5,305,316 | A | * | 4/1994 | Yoshida et al. ............. 370/357 |
| 5,311,451 | A | * | 5/1994 | Barrett ....................... 700/278 |
| 5,455,495 | A | * | 10/1995 | Bec ............................ 318/560 |
| 5,600,634 | A | * | 2/1997 | Satoh et al. ................. 370/294 |

(Continued)

FOREIGN PATENT DOCUMENTS

JP 08-102979 4/1996

(Continued)

*Primary Examiner*—David Martin
*Assistant Examiner*—Robert Horn

(57) ABSTRACT

In a servomotor controller, when a comparing circuit (70) detects that a position of an object to be controlled has been achieved to a target position, an operation inhibiting signal generating section (71) supplies an operation inhibiting signal (71a) to an operation permitting/inhibiting signal-processing section (66), and obtains an operation stopped state of an H bridge-driving processing section (67) for controlling driving of a motor. A LIN communication processing section (61) receives information to a self address supplied from a superordiante device, and outputs a forced operation (recovery) request (61R) in the received information. The operation state of the H bridge-driving processing section (67) is obtained through an operation permitting trigger signal generating section (65) and the operation permitting/inhibiting signal-processing section (66) through the H bridge-driving processing section (67). The motor is accordingly driven, and the feedback control based on the difference between the target position and the present position is restarted.

14 Claims, 14 Drawing Sheets

U.S. PATENT DOCUMENTS

| | | | | |
|---|---|---|---|---|
| 5,648,897 A | * | 7/1997 | Johnson et al. | 700/83 |
| 5,666,036 A | * | 9/1997 | Swanson | 318/295 |
| 5,705,907 A | * | 1/1998 | Miyamori et al. | 318/599 |
| 5,803,355 A | * | 9/1998 | Ureshino et al. | 236/13 |
| 5,856,733 A | * | 1/1999 | Matsumoto et al. | 318/663 |
| 5,902,180 A | * | 5/1999 | Sunaga et al. | 454/69 |
| 5,906,541 A | * | 5/1999 | Mizuno | 454/75 |
| 5,908,154 A | * | 6/1999 | Sunaga et al. | 236/49.3 |
| 6,009,934 A | * | 1/2000 | Sunaga et al. | 165/42 |
| 6,016,964 A | * | 1/2000 | Ohkubo | 236/13 |
| 6,020,708 A | * | 2/2000 | Matsumoto et al. | 318/601 |
| 6,273,771 B1 | * | 8/2001 | Buckley et al. | 440/84 |
| 6,708,089 B1 | * | 3/2004 | Hashimoto et al. | 701/1 |
| 6,794,842 B1 | * | 9/2004 | Sano | 318/567 |
| 6,801,007 B1 | * | 10/2004 | Takeuchi et al. | 318/479 |
| 6,805,094 B1 | * | 10/2004 | Hashimoto et al. | 123/396 |
| 6,827,284 B1 | * | 12/2004 | Ichishi et al. | 236/49.3 |
| 6,868,317 B1 | * | 3/2005 | Okuyama | 701/21 |
| 6,874,471 B1 | * | 4/2005 | Hoshino et al. | 280/805 |
| 6,877,669 B1 | * | 4/2005 | Sunaga et al. | 347/40 |

FOREIGN PATENT DOCUMENTS

| | | |
|---|---|---|
| JP | 08-186881 | 7/1996 |
| JP | 08-332832 | 12/1996 |
| JP | 09-099729 | 4/1997 |
| JP | 09-109662 | 4/1997 |
| JP | 09-134218 | 5/1997 |

* cited by examiner

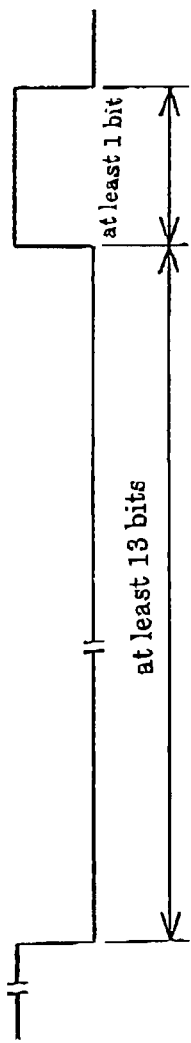
FIG. 6(a) Synch Break Field
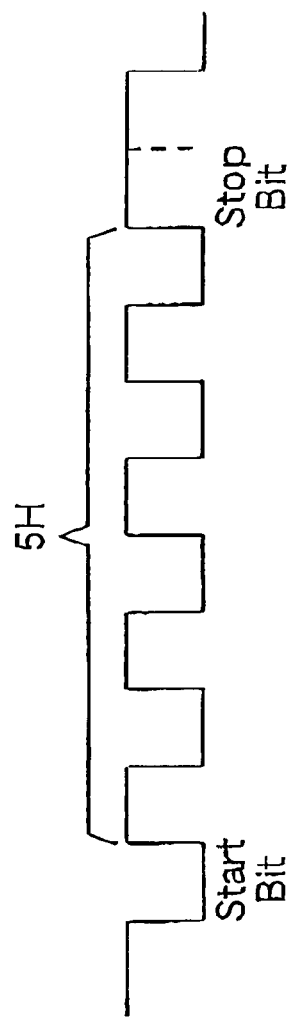
FIG. 6(b) Synch Field
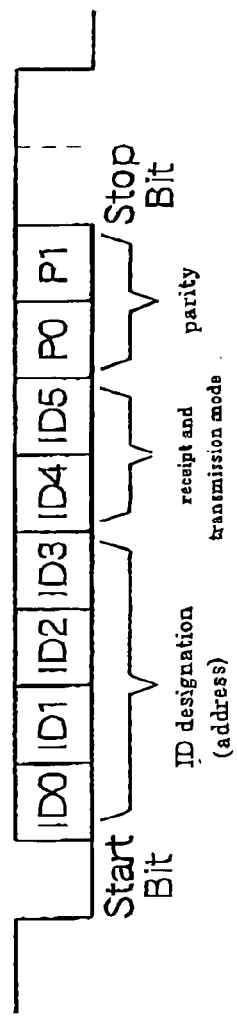
FIG. 6(c) ID Field

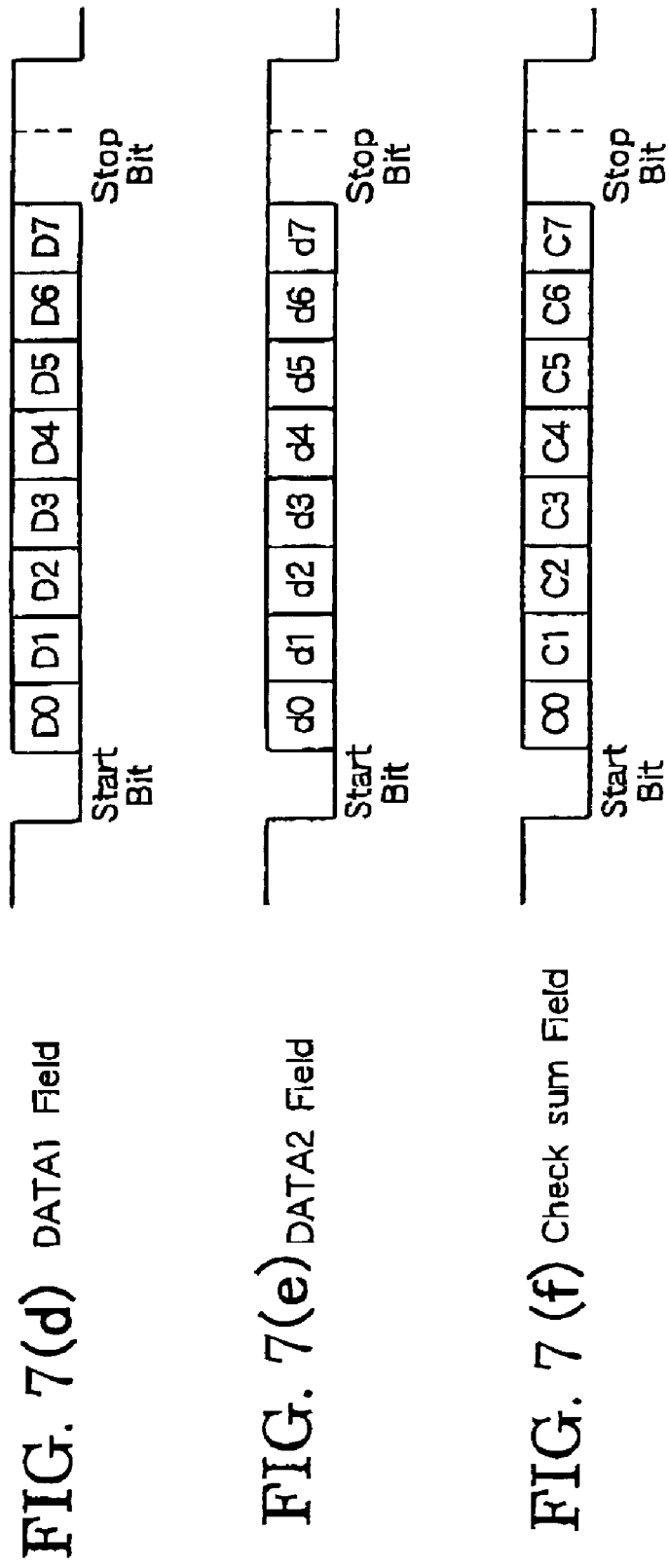

FIG.14 (a)   Temperature sensor
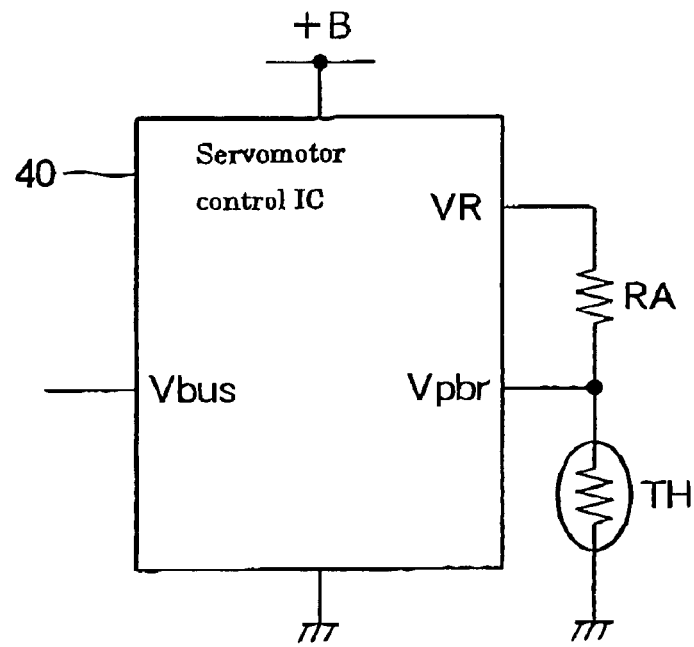
FIG.14 (b)   Illumination sensor
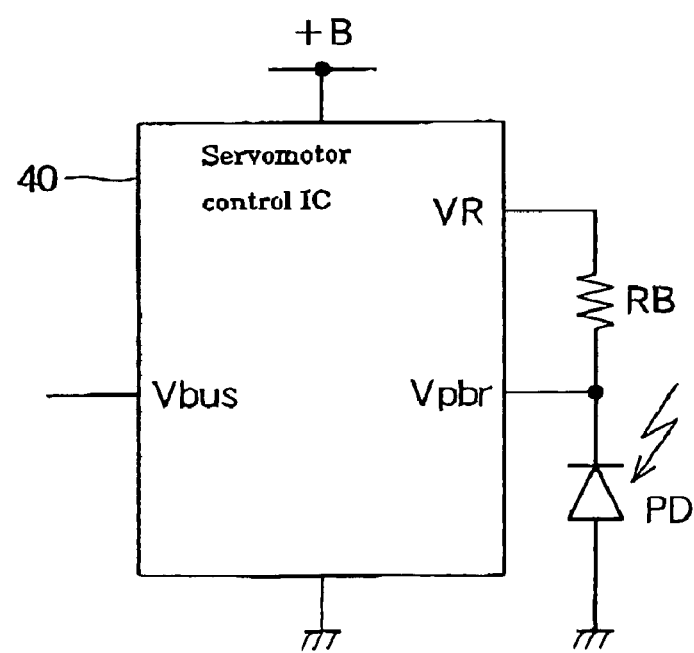

SERVOMOTOR CONTROLLER

BACKGROUND OF THE INVENTION

1. Field of the Invention

The present invention relates to a servomotor controller for driving actuators possessing electric motors. More particularly, the invention relates to a servomotor controller which can perform serial data communication between a superordinate device (control unit or the like).

The present invention also relates to a servomotor controller having a data communication function, in particular, to a servomotor controller capable of releasing a state that feedback control is stopped for preventing hunting, by a command from a superordinate device, and the like.

2. Related Art Statement (1) Problem 1 to be Solved

With respect to various doors arranged in an air-conditioning unit for an automobile, there has been formerly known an air-conditioning system which comprises respective actuators of the same kind each including a motor for driving the door, a position detector for detecting a present position of the door as a voltage and a control unit for controlling the motor based on given target positional data and outputs from the position detector, wherein these actuators of the same kind are totally controlled by a controller through serial communication. In the automobile air-conditioning system thus constructed, the controller counts the number of times of state changes of target position-reaching signals received from the actuator, and prevents long-time hunting of the actuator by transmitting a signal for stopping the actuator when the counted value becomes a predetermined value or above (See JP-A-8-332832).

Even though driving of the motor is stopped when the present position conforms to the target position, the present position exceeds the target position by overrun with inertia, and the control circuit manages to match the present position with the target position by reversely rotating the motor. By repeating this, vibration phenomenon so-called hunting is occurred, resulting in noise generation depending upon an application system. In order to prevent this hunting, a conventional method has been taken, which sets a range beyond the overrunning with respect to the target position as hysteresis, and stops the rotation of the motor when the present position exists within the hysteresis (See JP-A-8-186881).

There has been also known a conventional positioning device. In the positioning device for carrying out feedback control of a motor in order to stop an object to be controlled (hereinafter referred to as control object) in a target position, wherein the device outputs a driving-permitting signal to a driving circuit when signals beyond a stop range are continuously generated for a predetermined time or more, and by continuing the outputting of the driving-permitting signal during a predetermined time period from the beginning of the outputting, the driving circuit does not repeat ON and OFF operations even when an outside noise enters a present position signal or the like (See JP-A-9-134218).

Much load (processing amount) of the controller side is included in the methods which prevent hunting by observing the state changes of the target position-reaching signals received from the actuators. Moreover, when the hunting occurs, the actuators may carry on unnecessary operations and unnecessary power consumption until the stop signal is supplied from the controller side.

In the method which stops the rotation of the motor after the present position falls within the target range, when the motor is stopped before or after the target position through the noise entering the position detecting signal, a superordinate device (controller or the like) has to take a complicated handling method such as transmitting a dummy target value which is well off the target value for restarting the actuator, and then transmitting an appropriate target value again.

If the driving-permitting signal is output in order to avoid influence of the outside noise when the signals falling outside the stop range are continued for a predetermined time or more, a response becomes slow when changing the target value. On the other hand, if the outputs of the driving-permitting signals are continued for a predetermined time, the possibility of overrunning increases.

(2) Problem 2 to be Solved

There has been heretofore known an actuator which includes a serial data communicating section to receive target value data transmitted from a control unit and control the rotation of a motor so that an output from a rotating angle detector may be in conformity with a target value. The control unit feeds only the target value data to the actuator, and the motor is controlled from a side of the actuator alone. Thus, the control unit cannot recognize whether the motor normally operates or not.

Thus, the control unit transmits a diagnosis command to the actuator. When the actuator receives such a diagnosis command, an A/D converter converts an output from a rotary angle detector to a digital value, which is transmitted in the form of a given format via a transmitting circuit after being coded with an encoder. A data processing section of the control unit receives this datum via a receiving circuit and a decoder, so that a present value of the rotation angle of the motor can be known. Instead of transmitting a special command called the diagnosis command on diagnosing, it may be that every time the control unit transmits an ordinary target value, the actuator, which receives it, returns a present value datum.

However, the actuator requires the A/D converter for converting the outputs from the rotation angle detector to the digital values and the encoder for encoding the converted outputs so as to diagnose any trouble. On the other hand, the control unit requires the decoder for decoding the encoded data from the actuator. Consequently, the scale of the circuit becomes bulky.

Under the circumstances, the actuator is provided with a controlling termination detector which is adapted to detect the termination of controlling the rotation angle of the motor when the present value of the rotation angle of the motor reaches almost the target value as well as a transmitting unit which adds, to the controlling data, controlling termination data thereof and which outputs the added resultant to a communicating line when the receiver receives control data from the control unit. By this construction, the size of a circuit required for the self diagnosis is reduced, and a transmitting frame becomes shorter. Since the self diagnosis is performed by the transmitted data only, the number of communications per unit time can be increased to improve response performance (See JP-A 8-102979).

With respect to doors arranged in an air-conditioning unit, there are provided respective actuators of the same kind each including a motor for driving the door, a position detector for detecting a present position of the door as a voltage and a control circuit for controlling the motor based on given target positional data and outputs from the position detector and these actuators of the same kind are totally controlled by a controller through dual-directional serial communication.

In an automobile air-conditioning system thus constructed, it is known that after the controller transmits a given door positional information for inspection to a target one of the plural actuators, the controller detects if it received a target position-reaching signal from the target actuator, and then makes a displaying section display a detection result (See JP-A-9-99729).

In the automobile air-conditioning apparatus for controlling each of the actuators with the one line-type serial communication, it is known that communication signals (serial signals) transmitted and received through the communication line include actuator-discriminating information (address), driving/stopping signals for the motor, target stopping position signals (target position data) and error detection information (parity data) as information data from the auto amplifier (controller) to the actuator as well as the target position-reaching information as the information data from the actuator to the auto amplifier (controller) (See JP-A9-109662, paragraph 0030).

According to the system in which the target position-reaching information is transmitted from the actuator side to the control unit as the superordinate device, the amount of the data in the serial communication may be small, but as a matter of course, the system can make only self diagnosis as to whether the door reaches the target position. Therefore, it is difficult from the side of the control unit to predict any abnormality on the side of the actuators. For example, even if any actuator is in an overloaded state, such cannot be predict or detected.

As described in JP-A 8-102979, when a diagnosis command is transmitted from the control unit to the actuator and the actuator having received the diagnosis command returns the present positional data to the control unit, the controller can effect various diagnosis grasp the operation state of the actuator side and effect various diagnoses. However, in order to further add a diagnosis commanding menu to the existing system having no such a diagnosis commanding menu, a circuit and a program must be added to decode and execute the diagnosis command. Therefore, it may be necessary to newly construct a custom IC, etc. constituting a main portion of the actuator, so that it is often difficult to readily cope with the adoption of the diagnosis commanding menu.

If the actuator returns the present positional data to the control unit every time when the controller transmits the ordinary target value data, the target value data must be transmitted in obtaining the present positional data, which undesirably results in an increased amount of the communication data.

In order to diagnose the operation of the actuator side at the side of the control unit, the contents of the diagnosis can be enriched if not only the present positional data but also information on the rotating direction of the motor and the driven/stopped state of the motor.

SUMMARY OF THE INVENTION (1) Countermeasure 1 to Solve Problem 1

The present invention has been accomplished to solve the above problems, and is to provide a servomotor controller which can forcibly release an operation-stopped state by a command from an external.

In order to solve the problems, a servomotor controller according to the present invention is a servomotor controller for driving an electric motor type actuator having an electric motor, and is characterized to comprise a receiving processing section for receiving information to a self address which is supplied from a superordinate device through a serial data communication section, an actuator driving control section for performing a feedback control to a position of an object to be controlled by driving the electric motor type actuator in order for the position of the control object to be a target value based on the target value of the control object included in the received information and a present position detected by a position detecting section, an operation inhibiting device to inhibit an operation of the actuator driving control section after detecting that difference between the target value and the present value being in a previously set allowable range, and an operation permitting device to release a state that the operation of the actuator driving control section is inhibited based on a forced operation request included in the received information.

The servomotor controller according to the present invention releases the operation-stopped state when the forced operation request is supplied from a superordinate device. The feedback control is accordingly performed in order to adjust the position of the control object to the target value when the present value deviates from the previously supplied target value. Therefore, the superordinate device can solve the deviation without transmitting a new target value even if the present value is deviated from the target value.

When the forced operation request is set by at least 1 bit data or complex data of more than 1 bit, the control in the superordinate device side is facilitated, and the processing (control load) for releasing the operation stopped state in the servomotor controller side is reduced.

(2) Countermeasure to Solve Problem 2

The present invention has been accomplished to solve the above problems, and is aimed at providing a servomotor controller which can feed present positional data to a superordinate device (control unit), while an amount of communication data per one time communication between the superordinate device and an apparatus on a side of an actuator is not increased or said amount of the communication per one time communication between them is always kept constant. The present invention is also aimed at providing a servomotor controller which can feed information on the rotating direction and the driven/stopped state of a motor to a side of a superodinate apparatus (control unit).

In order to solve the above-mentioned problem, the servomotor controller according to the present invention comprises a serial data-communicating section, a receiving section for receiving information to a self address fed from a superordinate unit via the serial data-communicating section, an A/D converter for converting to n-bit present positional data a voltage fed from a position detecting section and corresponding to a present position of an object to be controlled, an actuator driving-controlling section for driving a motor actuator based on a deviation between n-bit target value data contained in the information received and the n-bit present positional data such that a position of the object may take a target value, and a transmitting section for transmitting the present positional data of a same bit number (n-bit) as that of the target value data via the serial data communicating section in response to a transmitting request contained in the information received.

According to the servomotor controller of the present invention thus constructed, the present positional data of the object to be controlled can be fed to the superodinate unit, in response to the transmitting request fed from the superordinate unit. Since the present positional data has the same bit number as that of the target value data, the amount of the communication data per one transmission can be made constant by transmitting the present positional data instead of receiving the target value data. The superodinate unit can diagnose the operation of the servomotor controller in detail through grasping time-series change characteristics, etc. of the present positional data. Further, breakage of the servomotor controller and the motor actuator can be prevented by predicting possible overloading of the servomotor controller and generating a command to stop the operation of the servomotor controller.

Another servomotor controller according to the present invention comprises a serial data-communicating section, a receiving section for receiving information to a self address fed from a superodinate unit via the serial data-communicating section, an A/D converter for converting to present positional data a voltage fed from a position detecting section and corresponding to a present position of an object to be controlled, an actuator driving-controlling section for judging a rotating direction of a motor and driving or stoppage of the motor based on a deviation between target value data contained in the information received and the present positional data and driving the motor actuator based on a result of the judgment such that a position of the object may reach a target value, and a transmitting section for transmitting information on the rotating direction of the motor and information on the driving and stoppage of the motor at present via the serial data communicating section in response to a transmitting request contained in the information received.

According to the servomotor controller of the present invention thus constructed, the information on the present rotational direction of the motor and the information on the present driving and stoppage of the motor can be fed to the superodinate unit, in response to the transmitting request fed from the superodinate unit. The superodinate unit can diagnose the operation of the servomotor controller based on the information thereon.

A further servomotor controller according to the present invention comprises a serial data-communicating section, a receiving section for receiving information to a self address fed from a superodinate unit via the serial data-communicating section, an A/D converter for converting to n-bit present positional data a voltage fed from a position detecting section and corresponding to a present position of an object to be controlled, an actuator driving-controlling section for judging a rotating direction of a motor and driving or stoppage of the motor based on a deviation between n-bit control target value data contained in the information received and the n-bit present positional data and driving the motor actuator based on a result of the judgment such that a position of the object may take a control target value, and a transmitting section for transmitting information on said present positional data and said rotating direction of the motor and the present driving and stoppage of the motor via the serial data communicating section, in response to a transmitting request contained in the information received.

According to the servomotor controller of the present invention thus constructed, the information on the present positional data and the present rotating direction of the motor and information on the present driving/stoppage of the motor can be fed to the superodinate unit.

The entire disclosure of Japanese patent application Nos. 2003-146677 (filed on May 23, 2003) and 2003-144550 (field on May 22, 2003) including their specifications, drawings and claims are incorporated herein by reference.

BRIEF DESCRIPTION OF THE DRAWINGS

For a better understanding of the invention, reference is made to the attached drawings, wherein:

FIG. 6 is a figure showing a first sheet of a data structure of each field in one frame of a LIN communication standard, FIGS. 6(a), 6(b), and 6(c) show the synch break field, the synch field, and the ID field, respectively.

FIG. 7 is a figure showing a second sheet of the data structure of each field in one frame of a LIN communication standard, FIGS. 7(d), 7(e), and 7(f) show the DATA-1 field, the DATA-2 field, and the Check sum field respectively.

FIGS. 14(a) and 14(b) are figures illustrating application examples of servomotor controlling ICs for the servomotor controller according to the present invention for other uses, FIG. 14(a) being the figure showing an example in which a temperature sensor is constructed and FIG. 14(b) being the figure showing an example in which an illumination (brightness) sensor is constituted.

DETAILED DESCRIPTION OF THE INVENTION (1) Countermeasure 1

In the following, one embodiment of an automobile air conditioner to which the servomotor controller according to the present invention is applied will be explained with reference to the drawings.

Figure 1:
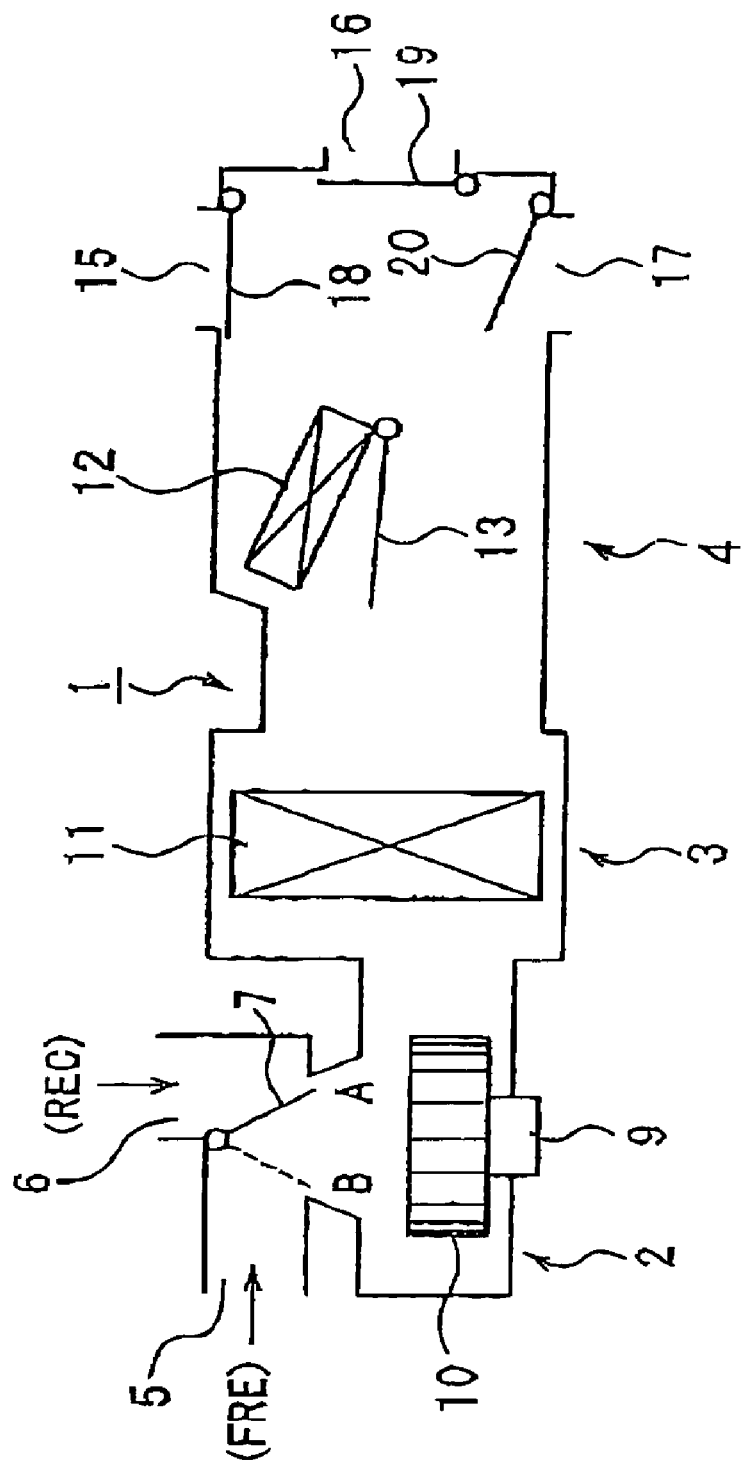
FIG. 1 is a figure illustrating a conceptual construction of a main body of an automobile air conditioner to which the servomotor controller according to the present invention is applied.

FIG. 1 is a figure showing a conceptual construction of a main body of an automobile air conditioner to which the servomotor controller according to the present invention is applied. In FIG. 1, a reference numeral 1 denotes the main body of the automobile air conditioner. As in the case with a general automobile air conditioner, the main body 1 is constituted by an intake unit 2 for selectively taking in fresh air or interior air, a cleaning unit 3 for cooling introduced air, and a heater unit 4 for conditioning the introduced air and controlling the temperature thereof and then blowing the conditioned air into a vehicle compartment.

The intake unit 2 is provided with a fresh air intake opening 5 for introducing the fresh air and an interior air intake opening 6 for introducing the interior air. An intake door 7 (a mechanism to be driven), which is adopted to adjust a ratio between the fresh air and the interior air to be introduced into the intake unit, is rotatably provided at a connecting portion between the intake openings 5 and 6. The intake door 7 is turned with an electric motor type actuator 30A as shown in FIG. 2.

Figure 2:
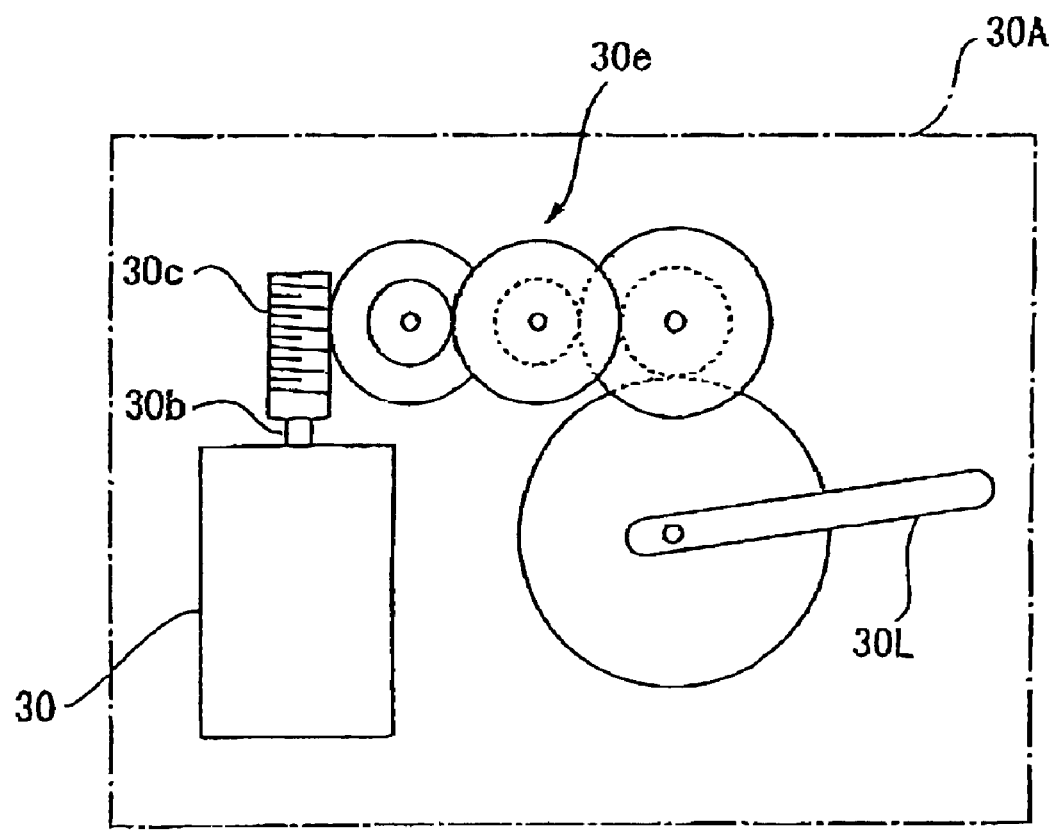
FIG. 2 is a figure illustrating an embodiment of an electric motor type actuator to be driven by the servomotor controller according to the present invention.

FIG. 2 is a figure illustrating an embodiment of an electric motor type actuator to be driven by the servomotor controller according to the present invention. The electric motor type actuator 30A comprises an electric motor 30, a worm 30c fitted to an output shaft 30b of the electric motor 30, a reduction gear mechanism 30e meshing with the worm 30, and an actuator lever 30 L turned via the worm 30c and the reduction gear mechanism 30e. As turning of the actuator lever 30L is transmitted to the intake door 7 in FIG. 1 via a link mechanism not shown, the intake door 7 is turned. Further, the turned position of the intake door 7 is detected with a potentiometer 31.

As shown in FIG. 1, the intake unit 2 is provided with a fan 10 which is turned at a given speed with a fan motor 9. The fan 10 is turned, so that the fresh air or the interior air is selectively sucked through the fresh air intake opening 5 or the interior air intake opening 6 depending upon the location of the intake door 7. When the turning speed of the fan 10 is changed by varying voltage applied to the fan motor 9, an amount of air blown into a vehicle compartment is adjusted. The fresh air (FRE) is introduced at a position A of the intake door 7 in FIG. 1, and the intake air is recycled (REC) at a position B shown therein.

The cleaning unit 3 contains an evaporator 11 constituting a freezing cycle. A refrigerant is fed to the evaporator 11 by activating a compressor not shown, and the introduced air is cooled through heat exchange with this refrigerant.

The heater unit 4 contains a heater core 12 through which engine-cooling water is circulated, and a mixing door 13 which adjusts a ratio between an amount of air passing the heat core 12 and that of the air bypassing the heat core 12 is rotatably provided upstream the heater core 12. The mixing door 13 is also turned by the electric motor type actuator 30A via link mechanism (not shown) as mentioned above. Changing the open degree of the mixing door 13 adjusts the mixed ratio between warmed air heated through passing the heater core 12 and non-heated cool air bypassing the heater core 12, whereby the temperature of air to be blown into the vehicle compartment is adjusted. The turned position of the mixing door 13 is also detected by the potentiometer 31 in the same manner as mentioned above.

The adjusted air is fed into the vehicle compartment via either one of a defrosting blowout opening 15, a ventilation blowout opening 16, or a foot blowout opening 17. A defrosting door 18, a ventilation door 19, and a foot door 20 are rotatably provided at these blowout openings 15 to 17, respectively, and turned by an electric motor type actuator via a link mechanism (not shown). Any arbitrary blowout mode is set by selectively combining the opened and closed states of the blowout openings 15 to 17.

Figure 3:
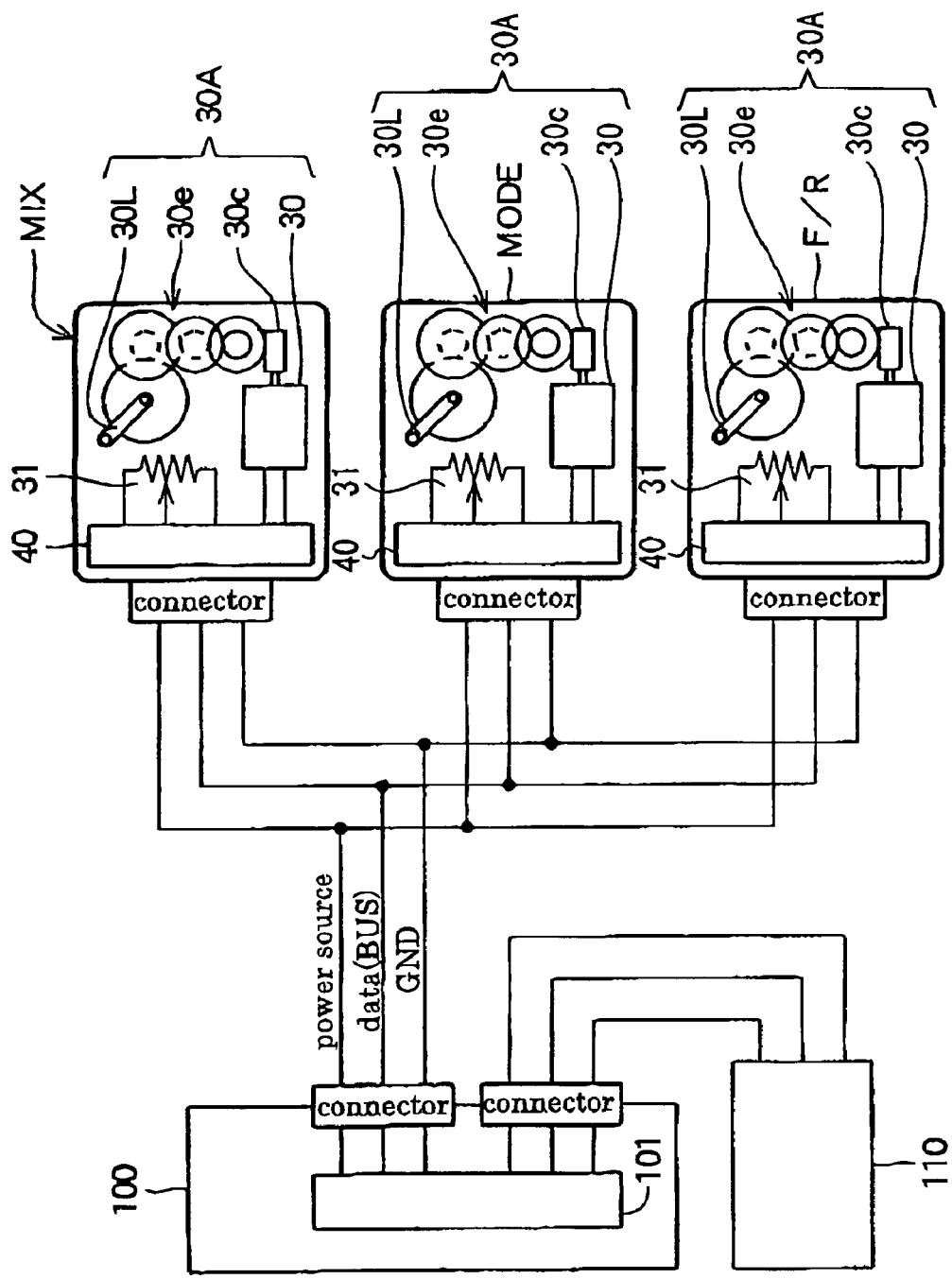
FIG. 3 is a figure illustrating a system construction of the automobile air conditioner to which the servomotor controller according to the present invention is applied.
Figure 4:
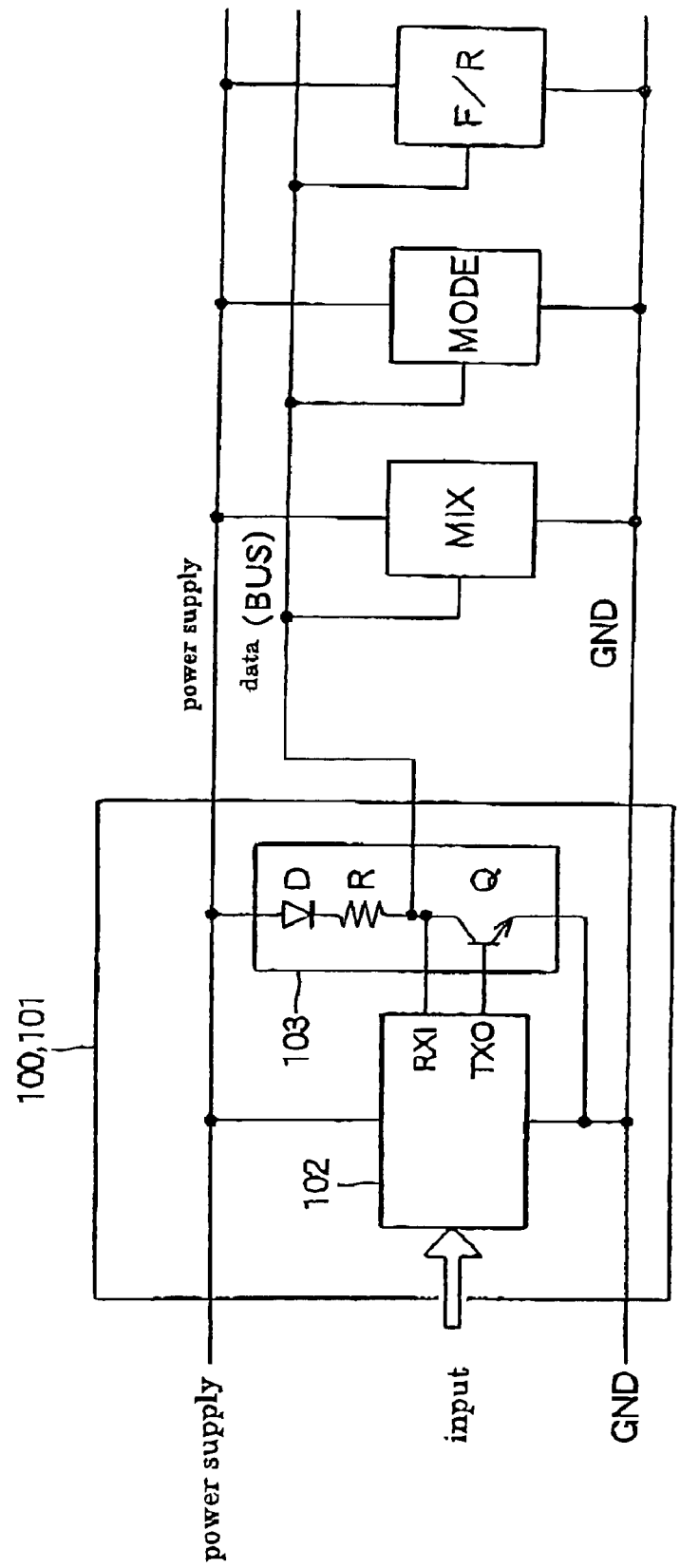
FIG. 4 is a figure showing a block diagram of the system construction of the automobile air conditioner to which the servomotor controller according to the present invention is applied.

FIGS. 3 and 4 are figures showing the system construction of an automobile air conditioner to which the servomotor controller according to the present invention is applied. By way of example, FIGS. 3 and 4 show the system using three electric motor type actuator units: a mixing door actuator unit MIX for opening or closing the mixing door 13, a mode actuator unit MODE for opening or closing the mode door which selects the blowout opening, and an intake door actuator unit F/R for opening and closing the intake door 7.

As shown in FIGS. 3 and 4, each of the actuator units MIX, MODE, and F/R comprises an electric motor type actuator 30A, a potentiometer 31 of which resistance value is changed interlocking with the turning of the actuator lever 30L, and a servomotor control circuit 40. The actuator, the potentiometer and the servomotor control circuit are assembled in a casing. Each of the actuator units, MIX, MODE, and F/R is provided with a three-terminal type connector. Each of the actuator units, MIX, MODE, and F/R is connected to a controller (superordinate device) 100 by means of a three-core cable consisting of an electric source line, a grounded (GND) line, and a data line (BUS).

As shown in FIG. 4, electricity is fed to each of the actuator units MIX, MODE, and F/R from a side of the controller 100. Serial data duplex communications are performed between the controller 100 and each of the actuator units MIX, MODE, and F/R via the data line (BUS) by an asynchronous communication system. A communication protocol is based on the LIN (Local Interconnect Network). The data line (BUS) is pulled up to an anode side of power source via a pull-up resistor (e.g., 1 k$\Omega$) R and a reverse-flow preventing diode D in a data input/output circuit 103 on the side of the controller 100. Data communication is performed by switching an emitter-grounded NPN type transistor Q based on the transmission data signals outputted from a transmission data output terminal TXO of a control circuit 102. Receipt of data is performed by effecting binary judgment of a voltage of the data line (BUS) supplied to a received data-inputting terminal RXI, based on a given voltage threshold value. In the serial data communication, the controller 100 is on a master side, and each of the actuator units MIX, MODE, and F/R on a slave side. In the slave side, a start bit is detected to take byte-oriented synchronous, and a bit clock is generated to read bit information.

An air conditioner controller 101 constituting the controller 100 controls operation of the air conditioner based on operational inputs from an operation panel 110 and inputs from various temperature sensors, etc. not shown, and makes operation states, etc. displayed in various displays units provided in the operation panel 110, as shown in FIG. 3. The air conditioner controller 101 controls the operation of each of the actuator units MIX, MODE, and F/R by transmitting order data such as target value data of open degrees of the doors to the actuator units MIX, MODE, and F/R. Further, the air conditioner controller 101 watches or diagnoses the operational state of each of the actuator units MIX, MODE, and F/R by making each of the actuators MIX, MODE, and F/R transmit information regarding the operational state and receiving it. An identification (ID) code (address) is allotted to each of the actuator units MIX, MODE, and F/R.

Figure 5:
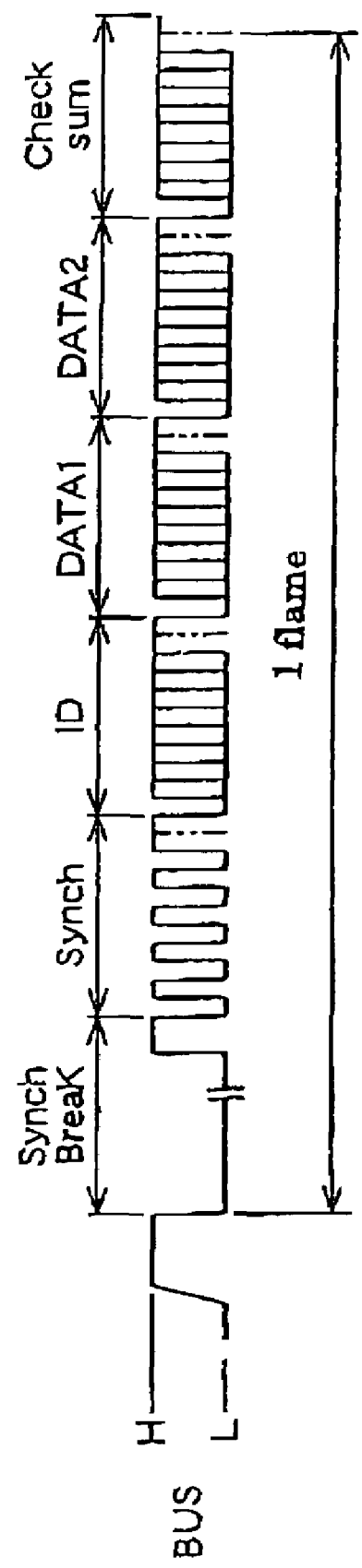
FIG. 5 is a figure showing a block diagram of the servomotor controller according to the present invention.

FIG. 5 is a figure showing a data structure of one frame of the LIN communication standard. Each of FIGS. 6(a), 6(b), and 6(c) and FIGS. 7(d), 7(e), and 7(f) is a figure showing a data structure of one field in one frame of the LIN communication standard. As shown in FIG. 5, one frame of the LIN communication standard consists of a synch break field (Synch Break), a synch field (Synch), an ID field (ID), and a data 1-field (DATA 1), a data 2-field (DATA 2), and a check sum field (Checksum).

As shown in FIG. 6(a), the synch break field comprises an L level continuing for a period of at least 13 bits and an H level for a period of at least 1 bit.

As shown in FIG. 6(b), the synch field comprises a start bit, 5 H data in a hexadecimal form as a bit synchronization signal and a stop bit for a period of at least one bit.

As shown in FIG. 6(c), the ID field comprises a start bit, a 4-bit identification code area (ID0 to ID3) for identifying a communication partner, a 2-bit receipt request/transmission request designating area (ID4 and ID5), 2-bit parity check data (P0 and P1), and a stop bit for a period of at least one bit. In this embodiment, the ID field designates either one of the door actuator units MIX, MODE, and F/R, and designates the operation mode at the DATA-1 field and thereafter (the receiving mode in which the door actuator unit receives various orders from the side of the controller 100 or a transmission mode in which the door actuator unit transmits the operational state or the like to the controller 100).

As shown in FIG. 7(d), the DATA-1 field comprises a start bit, 8-bit data (D0 to D7), and a stop bit for a period of at least one bit. In this embodiment, if a receiving request is indicated in the ID field, door open degree-designating data (target value data) is fed to the side of the servomotor control circuit 40 (slave side) from the side of the controller 100 (master side) by using the DATA-1 field. If the transmitting request is designated by the ID field, data of the present open degree of the door (present positional data) is fed from the side of the servomotor control circuit 40 (slave side) to the side of the controller 100 (master side) by using the DATA-1 field.

As shown in FIG. 7(e), the DATA-2 field comprises a start bit, 8-bit data (d0 to d7), and a stop bit for a period of at least one bit. In this embodiment, if the ID field designates the receiving request, various orders such as a communication error flag clearing request, a diagnosis flag clearing request, a motor PWM driving condition-setting request (whether performing a soft start and soft stop control of motor or not, or whether controlling an upper limit of electric power to be fed to a motor, and a torque control time when performing the soft start control or not), a motor urgent stoppage request, and a motor forced operation request (recovery request) are fed from the side of the controller 100 (master side) to the side of the servomotor control circuit 40 (slave side) by using the DATA-2 field.

If the ID field designates the transmission request, information regarding the operational state and abnormality detection such as an excess current-detecting flag, a motor stopping flag, a motor normal rotation flag, a motor reverse rotating flag, a received ID parity error flag, an excess temperature-detecting flag, a received sum check error flag, and an excess voltage-detecting flag are fed from the side of the servomotor control circuit 40 (slave side) to the side of the controller 100 (master side) by using the DATA-2 field.

As shown in FIG. 7(f), the Check sum field comprises a start bit, 8-bit data (C0 to C0), and a stop bit for a period of at least one bit. In this embodiment, data of the DATA-1 field and those of the DATA-2 field are added together as the Checksum data, and 8-bit reverse data obtained by adding a carrier to the added result are transmitted.

Figure 8:
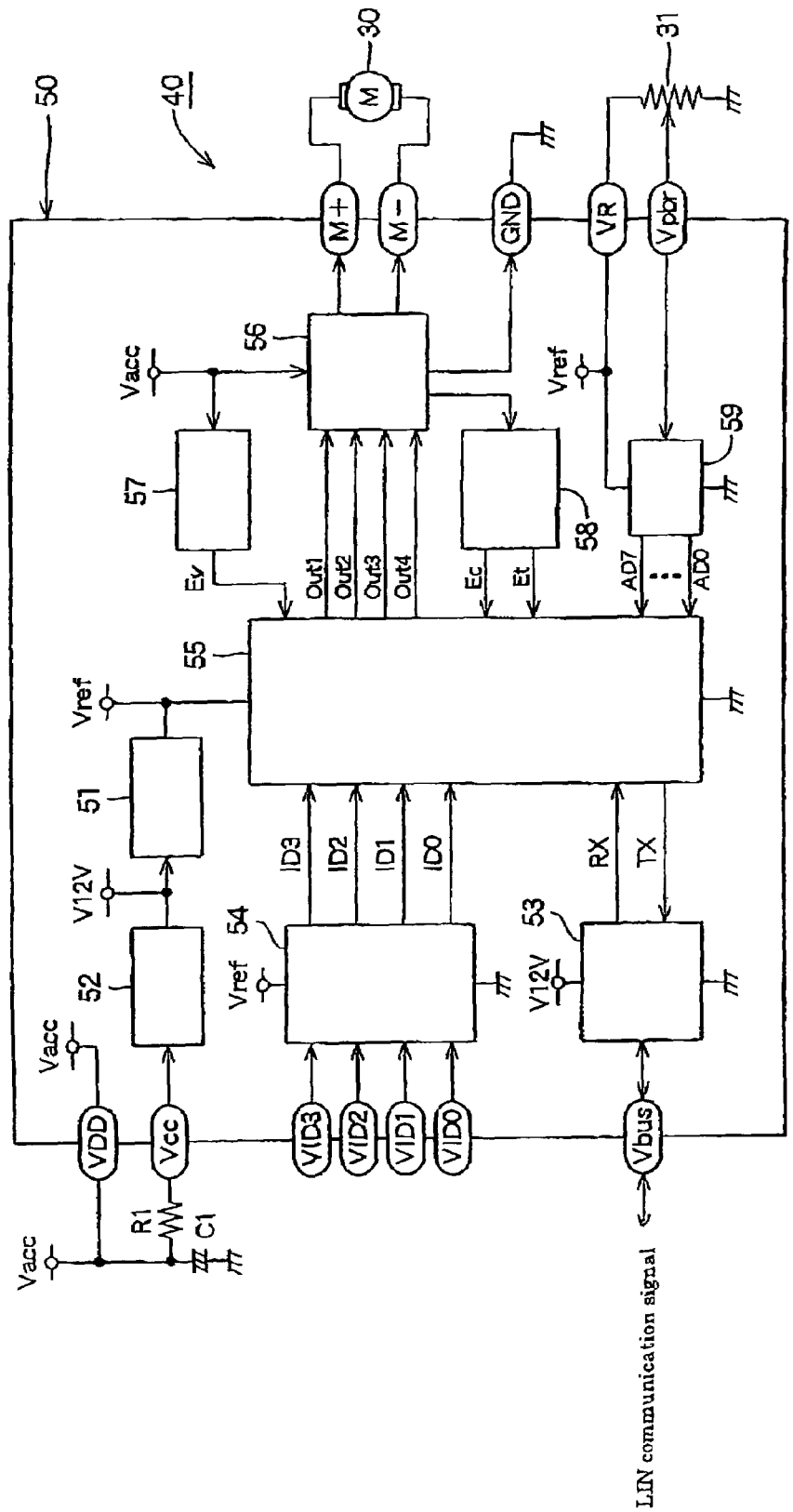
FIG. 8 is a figure showing a block diagram of the servomotor controller according to the present invention.

FIG. 8 shows a block diagram of the servomotor controller according to the present invention. The servomotor control circuit 40 is constituted, by using a servomotor control IC 50. The servomotor control IC 50 is a sole-use IC (custom IC) developed for controlling a DC motor. For example, the IC is produced by using a BiCDMOS process which can form a bipolar element, a C-MOS element, and a D-MOS on a single semiconductor chip.

The servomotor control IC 50 comprises a constant-voltage power source circuit 51 for generating, for example 5V stabilized power source Vref by receiving the supply of power from a battery power source Vacc supplied through an ignition switch, an accessory switch, and the like, an internal power source protection circuit 52 for protecting the constant-voltage power source circuit 51, a LIN input/output circuit 53 for inputting and outputting a LIN signal (serial communication signal), an ID input circuit 54 for setting an identification code (ID code), a logic circuit section 55 for carrying out various processing and controls such as communication processing and a driving control for a motor, a H bridge circuit 56 for supplying power to the motor 30, an excess voltage-detecting circuit 57 for detecting an excess voltage of the battery power source Vacc, an excess current/excess temperature detecting circuit 58 for detecting an excess current of the motor and a temperature rise (excess temperature) of each of power switching element (MOSFET) constituting the H bridge circuit 56 beyond an allowable range, and an A/D converter 59 for converting an output voltage (voltage corresponding to the open degree of the door) of a potentiometer 31 to digital data.

VDD is the power source terminal of the battery power Vacc for the H bridge circuit 56. Vcc is the power source terminal of the battery power source Vacc of which current is limited by a current-limiting resistor R1, C1 is a power-stabilizing capacitor, and GND is a grounded power source terminal.

VID0 to VID3 are input terminals for setting the identification codes (ID codes). In this embodiment, the identification codes (ID codes) are in a 4-bit form, and 16 kinds of identification codes (in other words, address) can be set at the maximum. An L level (logic "0") can be set by grounding these ID input terminals VID0 to VID3, whereas an H level (logic "1") can be set in an opened state.

Vbus is an input/output terminal for serial communication signals (specifically, LIN communication signals), that is, a connecting terminal for the data line (BUS). M+ and M− are output terminal for the H bridge circuit 56 and connecting terminal for the motor 30, respectively.

VR is an output terminal of a stabilized power source Vref, and connected to the one end of the potentiometer 31. Vpbr is an input terminal of an output voltage (voltage corresponding to the open degree of the door) of the potentiometer 31. V12V is a battery power source of which current is limited, and applies voltage to the LIN input/output circuit 53.

Figure 9:
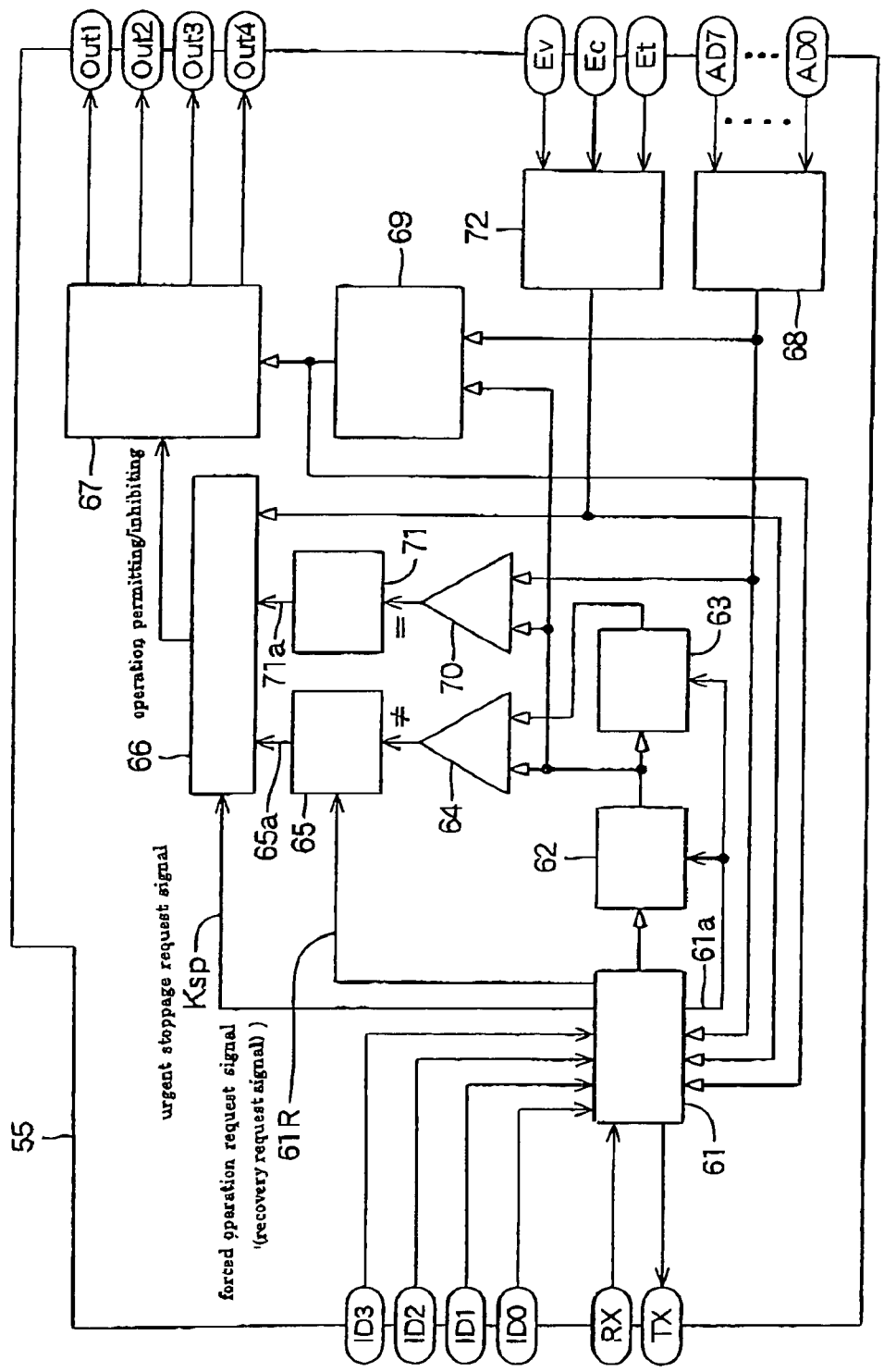
FIG. 9 is a figure showing one embodiment of a logic circuit of the servomotor controller according to the present invention.

FIG. 9 is a figure showing one example of a logic circuit 55 of the servomotor controller. An LIN communication processing section 61 decodes received signals RX from the LIN input/output circuit 53, and temporarily saves in a temporary register or the like 8-bit data of the DATA-1 field, the DATA-2 field, and the Check sum field, if the parity check result of the ID field is normal, the received ID code is in coincidence with the self ID code and a receiving request is designated by 2 bits of ID4 and ID5 in the ID field.

After the LIN communication processing section 61 has checked no error by carrying out the sum check with respect to each of temporarily saved data, the 8-bit data of the designated open degree of the door (target value data) in the DATA-1 field are fed to a new designation data latch circuit 62, and a communication-establishing trigger signal 61a is outputted to latch the data of the designated open degree of the door (target value data) to the new designation data latch circuit 62. At that time, data of previously designated open degree (target value data) of the door already stored in the new designation data latch circuit 62 are shifted to a former designation data latch circuit 63.

When the forced operation request (recovery request) in the DATA-2 field is, for example, logic "1" for requesting the forced operation, the LIN communication processing section 61 generates a forced operation request signal (recovery request signal) 61R and outputs the signal. When the urgent stoppage request in the DATA-2 field is logic "1" for requesting the urgent stop, for example, the LIN communication processing section 61 generates an urgent stoppage request signal Ksp and outputs the signal.

Further, if an error appears in a result of checking the parity of the ID field, the LIN communication processing section 61 sets a received ID parity error flag. If an error appears as a result of sum checking, the LIN communication processing section 61 sets a received sumcheck error flag.

A first comparison circuit 64 compares new data of designated open degree of the door (target value data) with old ones thereof, and feeds the comparison result (outputted if no conformity occurs) to a motion-permitting trigger signal generating section 65 if the both data are different.

The motion-permitting trigger signal generating section 65 generates a motion-permitting trigger signal 65a if the new and old data of the open degrees of the door differ from each other, and feeds the signal to a motion permitting/inhibiting signal-processing section 66. Further, the motion permitting/inhibiting signal-processing section 66 generates the motion permitting trigger signal 65a if the forced operation request signal 61R (recovery signal) is supplied from the LIN communication processing section 61, and feeds the signal to the motion permitting/inhibiting signal-processing section 66.

The motion-permitting/inhibiting signal-processing section 66 feeds a motion-permitting signal to an H bridge-driving processing section 67 when receiving the motion-permitting trigger signal 65a.

The output of the potentiometer 31 for detecting the open degree of the door is converted into the 8-bit data AD0 to AD7 of the actual open degree of the door (present value data) every A/D conversion cycle preset by means of the A/D converter 59 shown in FIG. 8.

A filtering section 68 shown in FIG. 9 effects processings including determination of the average value of a given number of data of the actual open degree of the door (present value data) AD0 to AD7, which are continued on time series, and outputs the result as the actual open degree of the door after the filtering treatment.

A section 69 for generating CW, CCW, and HOLD instructing signals compares the data of the designated open degree of the door (target value data) with the data of the actual door open degree of the door (present value data) after the filtering treatment, and determines a rotating direction of the motor 30 based on a deviation between them. The CW, CCW, and HOLD instructing signal generating section 69 generates and outputs a rotating direction-instructing signal (CW, CCW) to instruct the motor 30 to be driven in the normal direction (CW: clockwise direction) to open the door or to be driven in a reverse direction (CCW: counterclockwise direction) to close the door. If the data of the instructed open degree of the door (target value data) is almost in conformity with the data of the actual open degree of the door (present value data), the CW, CCW, and HOLD instruction signal generating section 69 generates and outputs a HOLD signal to hold the present position and stop the driving of the motor 30, so that a hunting phenomenon is prevented.

The H bridge-driving processing section 67 generates and outputs driving signals Out1 to Out4 for power-switching elements (for example, MOS-FET), which constitute respective arms of the H-bridge circuit 56, based on the rotating direction-instructing signal (CW, CCW) when the motion-permitting signal is fed from the motion-permitting/inhibiting signal processing section 66. Thereby, electric power is fed from the H-bridge circuit 56 to the motor 30 in FIG. 8, so that the motor 30 is driven.

When the soft start and the soft stop of the motor is set by the motor PWM driving condition-setting request in the DATA-2 field, the H bridge-driving processing section 67 may effect the soft start control to gradually increase the power to be supplied to the motor 30 at starting the motor 30 through the PWM control so that noise at the start of the motor may be reduced. The H bridge-driving processing section 67 also may effect the soft stop operation to gradually reduce the power to be supplied to the motor 30 by the PWM control from the point where the present value (actual open degree of the door) of an object to be controlled (hereinafter referred to as control object) such as a door approaches to the target value (designated open degree of the door) so that noise at a time of stopping the motor may be reduced. The PWM driving condition-setting request is fed from the LIN communication processing section 61 to the H bridge-driving processing section 67; however, the illustration of the signal line therefore is omitted in FIG. 9.

A second comparison circuit 70 compares data of the designated open degree of the door (target value data) with those of the actual open degree thereof (present value data) after the filtering treatment, and if the both data are matched, the second comparison circuit 70 feeds a comparison result (outputted in case of conformity) to a motion-inhibiting signal generating section 71.

The motion-inhibiting signal generating section 71 generates and outputs a motion-inhibiting signal 71a, if the present open degree of the door is in conformity with the target value. The motion-inhibiting signal 71a is fed to the motion-permitting/inhibiting signal-processing section 66.

The motion-permitting/inhibiting signal-processing section 66 stops the output of the driving permitting signal if the motion-inhibiting signal 71a is fed from the motion-inhibiting signal generating section 71, and feeds the operation inhibiting signal to the H bridge-driving processing section 67 to stop the driving of the motor 30.

If any one of an excess voltage-detected signal Ev from the excess voltage detecting circuit 57 and an excess current-detected signal Ec and an excess temperature-detected signal Et from the excess current/excess temperature-detecting circuit 58 is fed to an excess current/excess temperature/excess voltage processing unit 72, the processing unit 72 sets a flag corresponding to the detected abnormality, and feeds the information showing the occurrence of such abnormality is fed to the motion permitting/inhibiting signal-processing section 66. When the information showing the occurrence of the abnormality is fed to the motion permitting/inhibiting signal-processing section 66, the section 66 stops the output of the motion permitting signal and feeds the motion-inhibiting signal to the H bridge-driving processing section 67 to inhibit the driving of the motor 30.

If the parity check result of the ID field is normal, the received ID code is in conformity with the self ID code and the transmission request is designated by 2 bits of ID4 and ID5 in the ID field, the LIN communication processing section 61 sets 8-bit data of the actual open degree of the door (present value data) after filtering treatment as data to be transmitted in the DATA-1 field, and also sets the following data as the data to be transmitted in the DATA-2 field.

For example, an excess current-detecting flag, a motor stopping flag, a CW flag showing the normal rotational direction (CW) of the motor and a CCW flag showing the reverse rotational direction (CCW) of the motor are set for a lowest-place bit d0, the second-place bit d1, a third-place bit d2, and a fourth-place bit d3 of the DATA-2 field, respectively, whereas a received ID parity error flag, an excess temperature-detecting flag, a received sumcheck error flag, and an excess voltage-detecting flag are set for a fifth-place bit d4, a sixth-place bit d5, a seventh-place bit d6, and a highest-place bit d7, respectively. And, for example, data to be transmitted by the DATA-1 field is added to the data to be transmitted in the DATA-2 field, and carrier data produced by the addition are added to the added result, thereby obtaining reverse data, which is taken as check sum data to be transmitted in the Check sum field.

Speedily (for example, in a time period of 2 bits) after the ID field is terminated, the LIN communication processing section 61 successively transmits the data of the DATA-1 field, the DATA-2 filed, and the Check sum field. By so doing, the data of the actual open degree of the door (present positional data), the information on the operational state of the motor such as the rotating direction of the motor and the stoppage of the motor, the information on detection of abnormality of excess current, excess voltage, and excess temperature and information on occurrence of errors at the time of receipt of the data are fed to the controller 100 as a superodinate unit (master side).

Therefore, the controller 100 can diagnose the operation of the servomotor control circuit 40 in detail. Further, the controller 100 predicts overload of the servomotor control circuit 40 and generates an instruction (urgent stoppage request) to stop the operation of the servomotor controller, so that breakage of the servomotor control circuit 40 and the electric motor type actuator 30A can be prevented.

As described above, the LIN communication processing section 61 decodes the received signal RX supplied from the LIN input/output circuit 53. If the parity check result of the ID field is normal, the received ID code is in conformity with the self ID code, and the receiving request is designated by 2 bits of ID4 and ID5 in the ID field, the LIN communication processing section 61 receives the 8-bit data of each of DATA-1 field, DATA-2 field, and Check sum filed. After the LIN communication processing section 61 has checked that the received data does not include errors, the LIN communication processing section 61 feeds the 8-bit data of the designated open degree of the door (target value data) of the DATA-1 field to the new designation data latch circuit 62, and makes the data of designated open degree of the door (target value data) latch on the new designation data latch circuit 62 by outputting the communication-establishing trigger signal 61a.

Next, the LIN communication processing section 61 decodes the content of the DATA-2 field, and makes processing. If the receiving request is set in the ID field, various requests are fed from the controller 100 side (master side) to the servomotor control circuit 40 side (slave side) by using the DATA-2 field.

In this embodiment, the communication error flag clearing request is fed by a lowest-place bit d0 of the DATA-2 field. When the logic of the lowest-place bit d0 is "1", the LIN communication processing section 61 clears the received ID parity error flag and the received sum check error flag. When the logic of the lowest-place bit d0 is "0", the LIN communication processing section 61 does not change the state of each flag.

The diagnosis flag-clearing request is fed by the second-place bit d1 of the DATA-2 field. If the logic of the second-place bit d1 is "1", the LIN communication processing section 61 clears all of the excess current-detecting flag, the excess temperature-detecting flag, and excess voltage-detecting flag. If the logic of the second-place bit d1 is "1", the LIN communication processing section 61 does not change the state of each flag.

An output PWM control request is fed by the third-place bit d2 of the DATA-2 field. Here, the output PWM control means that the motor is softly started by gradually increasing the duty ratio of the PWM control when the motor is started, and the motor is softly stopped by gradually reducing the duty ratio of the PWM control when the difference between the data of designated open degree of the door (target value data) and the data of the actual open degree of the door (present value data) after the filtering treatment becomes a predetermined setup value or less. When the logic of the third-place bit d2 is "1", the control of the soft start and the soft stop is required. When the logic is "0", the control of the soft start and the soft stop is unnecessary. The LIN communication processing section 61 feeds the information as to whether or not the control of the soft start and the soft stop is carried out to the H bridge-driving processing section 67.

A PWM torque control time period-setting request is fed by the fourth-place bit d3 of the DATA-2 field. Here, the PWM torque control time period means the time period driving which the soft start is carried out by the output PWM control. In particular, it is the time period driving which the duty ratio is changed from 0 or the minimum duty value to 100 percent when the soft start is carried out. In this embodiment, when the logic of the fourth-place bit d3 is "1", 500 ms (millisecond) is set, and when the logic is "0", 250 ms (millisecond) is set. The LIN communication processing section 61 feeds the information regarding the control time for performing the output PWM control (soft start control) to the H bridge-driving processing section 67. Description of a signal path for feeding the information regarding the control time to the H bride-driving processing section 67 is omitted in FIG. 9. In the soft stop, the duty ratio is set based on the difference between the data of the designated open degree of the door (target value data) and the data of the actual open degree of the door (present value data) after the filtering treatment.

A motor supplying power control request is fed by the fifth-place bit d4 and the sixth-place bit d5 of the DATA-2 field. Here, the motor supplying power control is set to control or not to control the upper limit of power to be supplied to the motor by the PWM control, or to control the upper limit of power to he supplied to the motor only when the output PWM control (soft start and soft stop control) is carried out, or to control the upper limit of power to be supplied to the motor even when the output PWM control (soft start and soft stop control) is not carried out. The control of the power to be supplied to the motor is performed by setting the upper limit for the duty ratio in the PWM control.

In the embodiment, when the logic of the fifth-place bit d4 is "1", the upper limit value of the duty ratio is set to approximately 70 percent. When the logic of the fifth-place bit d4 is "0", the upper limit value of the duty ratio is set to 100 percent. When the logic of the sixth-place bit d5 is "1", it is set that the upper limit of the power to be supplied to the motor is controlled only when the output PWM control (soft start and soft stop control) is performed. When the logic is "0", it is set that the upper limit of the power to be supplied to the motor is controlled all the time (even when the output PWM control (soft start and soft stop control) is not carried out).

In addition, in case that the upper limit of power to be supplied to the motor is adopted to be controlled only when the output PWM control (soft start and soft stop control) is carried out, the upper limit value of the duty ratio may be switched to 4 levels such as 100%, approximately 94%, approximately 88%, and approximately 75% by using 2 bits of bit d4 and bit d5. Alternatively, in case that the upper limit of power to be supplied to the motor is adopted to be controlled all the time (even when the output PWM control (soft start and soft stop control) is not carried out), the upper limit value of the duty ratio may be switched to 4 levels, for example, 100%, approximately 94%, approximately 88%, and approximately 75% by using the 2 bits of bit d4 and bit d5.

The LIN communication processing section 61 supplies the information for the motor supplying power control request to the H bridge-driving processing section 67. However, a signal line to the H bridge-driving processing section 67 is omitted in FIG. 9.

The urgent stoppage request is fed by the seventh-place bit d6 of the DATA2 field. When the logic of the seventh-place bit d6 is "1", the power supply to the motor is forcibly shut down. When the logic of the seventh-place bit d6 is "0", the state that the power supply to the motor is forcibly shut down is released to realize the state capable of supplying power to the motor (normal operation state). The LIN communication processing section 61 supplies the urgent stoppage request signal Ksp to the operation permitting/inhibiting signal-processing section 66. After the motor is brought to the urgent stop, the forced operation request (recovery request) is used when the motor is again rotated. Moreover, when the motor is again rotated after the urgent stop of the motor, data of designated open degree different from the previous data may be provided.

When the urgent stop request signal Ksp is fed, the operation permitting/inhibiting signal-processing section 66 stops the outputting the operation permitting signal, and supplies the operation inhibiting signal to the H bridge-driving processing section 67.

The forced operation request is fed by the highest-place bit d7 of the DATA-2 field. When the logic of the highest-place bit is "1", the power supply to the motor is forcibly initiated. When the logic of the highest-place bit is "0", the normal operation state is achieved. The LIN communication processing section 61 feeds the forced operation request signal 61R to the operation permitting/inhibiting signal-processing section 66.

In this embodiment, a serial data communication section described in the claims is composed of the LIN input/output circuit 53 and the logic circuit 55. A receiving processing section described in the claims is configured by the LIN communication processing section 61 in the logic circuit 55. An actuator driving control section described in the claims is composed of the H bridge-driving processing section 67, the filtering treatment section 68, the CW, CCW, and HOLD designating signal generating section 69 and the A/D converter 59. An operation inhibiting device described in the claims is constructed by the second comparison circuit 70, the operation inhibiting signal generating section and the operation permitting/inhibiting signal-processing section 66. Moreover, an operation permitting device described in the claims is composed of the operation permitting trigger signal generating section 65 and the operation permitting/inhibiting signal-processing section 66.

When the target value (designated open degree of the door) is fed from the controller 100 side, the servomotor control circuit 40 drives the electric motor 30 based on the present value (actual open degree of the door) detected by the potentiometer 31 and the target value, and performs the feedback control in order for the open degree of the door which is the control object to be the target value. When the target value and the present value are matched (or substantially matched), the servomotor control circuit 40 stops the electric motor 30 by outputting the operation inhibiting signal from the operation permitting/inhibiting signal-processing section 66, and stops the feedback operation. The fluctuation of the open degree of the door in the vicinity of the target value, which is so-called hunting phenomenon, can be prevented by stopping the operation.

In this case, if noise is mixed in the signal related to the present value detected by the potentiometer 31, the operation is stopped in a position different from the target value by the influence of noise. On the other hand, the controller 100 can obtain the present value, the rotating direction of the motor, the motor stopped state, the error-checked result of the received data, and the abnormality detection results such as the excess current, excess voltage, and excess temperature from the servomotor control circuit 40 by providing the transmitting request to the servomotor control circuit 40. Therefore, the controller 100 can detect that the present value deviates from the target value supplied to the servomotor control circuit 40. In this case, the controller 100 only provides the forced operation request (recovery request) to the servomotor control circuit 40.

If the forced operation request (recovery request) is fed, the servomotor control circuit 40 releases the operation stopped state, feeds the operation permitting signal to the H bridge-driving processing section 67, and restarts the feedback control based on the difference between the target value and the present value. The deviation of present value from the target value is accordingly solved.

The feedback control based on the difference between the target value and the present value can be restarted by providing a new target value from the controller 100 to the servomotor control circuit 40 as well as the conventional method. However, in that case, the controller 100 has to provide a proper target value again after giving a dummy target value which is different from the previously provided target value, so that the processing amount of the controller 100 side is increased. The control of the controller 100 side is facilitated by using the forced operation request (recovery request), and the processing (controlling load) for releasing the operation stopped state of the servomotor control circuit 40 side is reduced.

In this embodiment, the example in which the forced operation request (recovery request) is allocated to the specific 1 bit in the DATA-2 field is shown, but the forced operation request (recovery request) and another request may be carried out at the same time by setting the forced operation request (recovery request) with complex data of more than 1. The feedback operation may be restarted by combining the function of the forced operation request (recovery request) to the communication error flag clearing request and the diagnosis flag-clearing request and then by releasing the operation stopped state as well as clearing the various flags when these clearing requests are received.

In this embodiment, the example for controlling the open degree of various doors of the automobile air conditioner was given by using the servomotor controller. However, the servomotor controller according to the present invention can be applied to various applications including actuators for linearly moving not only the door actuator but also a control object.

In this embodiment, the hardware based circuit structure is explained for the logic circuit 55, but the logic circuit 55 may achieve the function by a program control using a one chip microcomputer or the like.

As described above, the servomotor controller according to the present invention releases the operation stopped state for preventing the hunting when the forced operation request is fed from the superordinate device, so that the feedback control is performed in order for the position of the control object to be the target value when the present value is deviated from the previously supplied target value. Consequently, when the present value is deviated from the target value, the superordinate device can solve the deviation without transmitting a new target value. The forced operation request is set by at least one-bit data or complex data of more than 1 bit, so that the control by the superordinate device is facilitated, and the processing (control load) for releasing the operation stopped state of the servomotor controller side is reduced.

(Countermeasure 2)

The explanation made above in connection with FIG. 1 to FIG. 9 is also applicable to the Countermeasure 2, provided that in FIG. 9, "forced operation request signal (recovery request signal) 61R" and "urgent stop request signal Ksp" may be optional for the Countermeasure 2. The Countermeasure 2 will be described in more detail further, while repeated explanation on FIG. 1 to FIG. 9 is avoided. In the following, one embodiment of an automobile air conditioner to which the servomotor controller according to the present invention will be explained with reference to the drawings.

Figure 10:
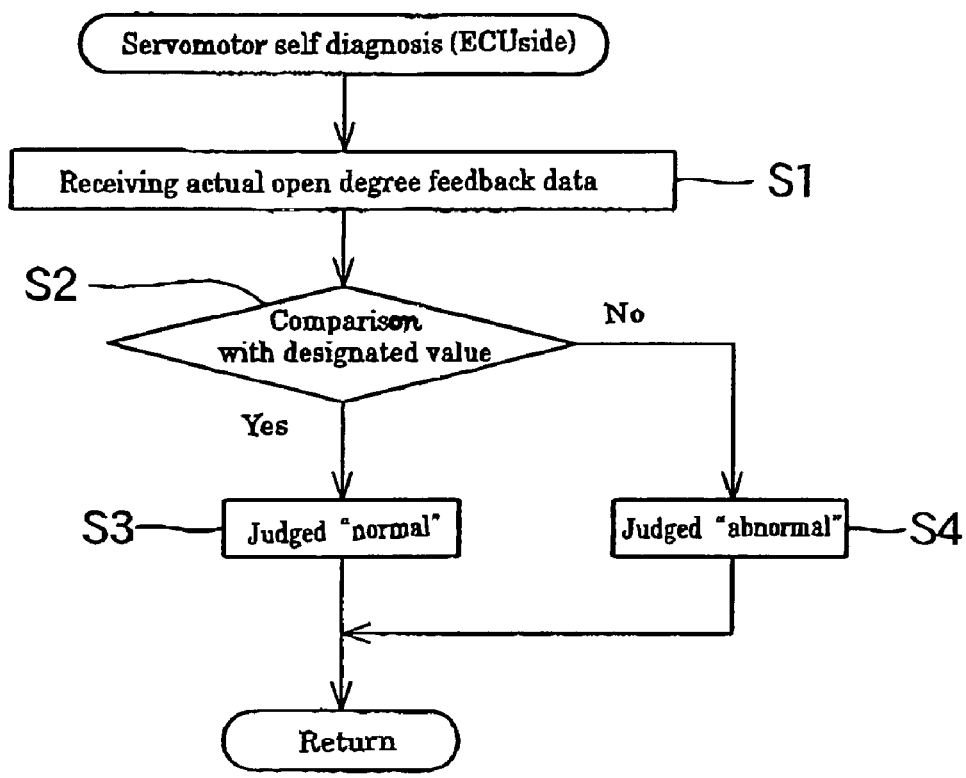
FIG. 10 is a flow chart showing a diagnosing operation of the servomotor controller based on feedback data of the open degree of a door.

FIG. 10 is a flow chart showing diagnosing operation of the servomotor controller based on feedback data of the open degree of the door. The controller 100 such as ECU, which controls the entire operation of the automobile air conditioner, receives the data of the actual open degree (present position data) (Step 1), and compares the actual open degree with the designated value (target value) (Step 2). It is judged that the operation on the side of the servomotor control circuit 40 is normal if the designated value is in conformity with the actual open degree (Step 3), and that the operation on the side of the servomotor control circuit 40 is abnormal if they are not in conformity with each other (Step 4).

Figure 11:
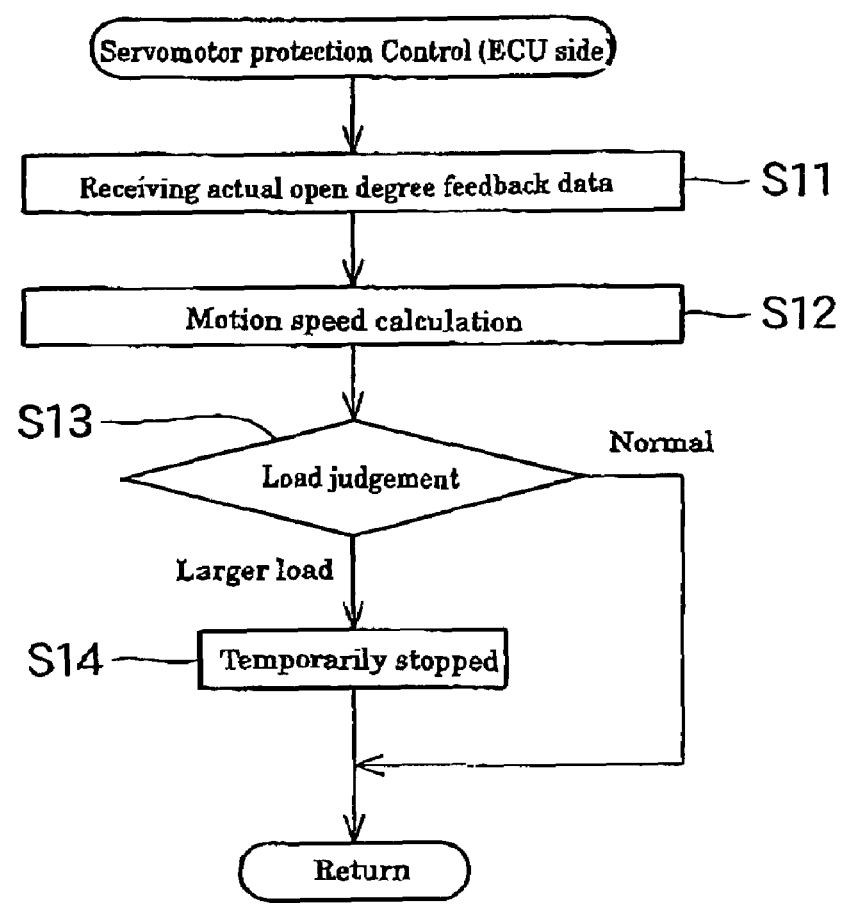
FIG. 11 is a flow chart showing a protective operation of the servomotor controller.

FIG. 11 is a flow chart showing a protecting operation of the servomotor controller. The controller 100 receives the feedback data of the actual open degree (present position data) (Step 11), and calculates a motion speed of opening or closing the door from changes in the actual open degree for a given time period (Step 12). A magnitude of the load is judged based on the calculated motion speed (Step 13). The controller 100 judges that the load is excess, if the motion speed is smaller than a preset judgment threshold value or a motion speed calculated in the past, and then stops the motion of the operation of the servomotor circuit 40 for a given time period at Step 14. By so doing, the breakage of the servomotor control IC 50 and the electric motor type actuator 30A due to overloading can be prevented.

Figure 12:
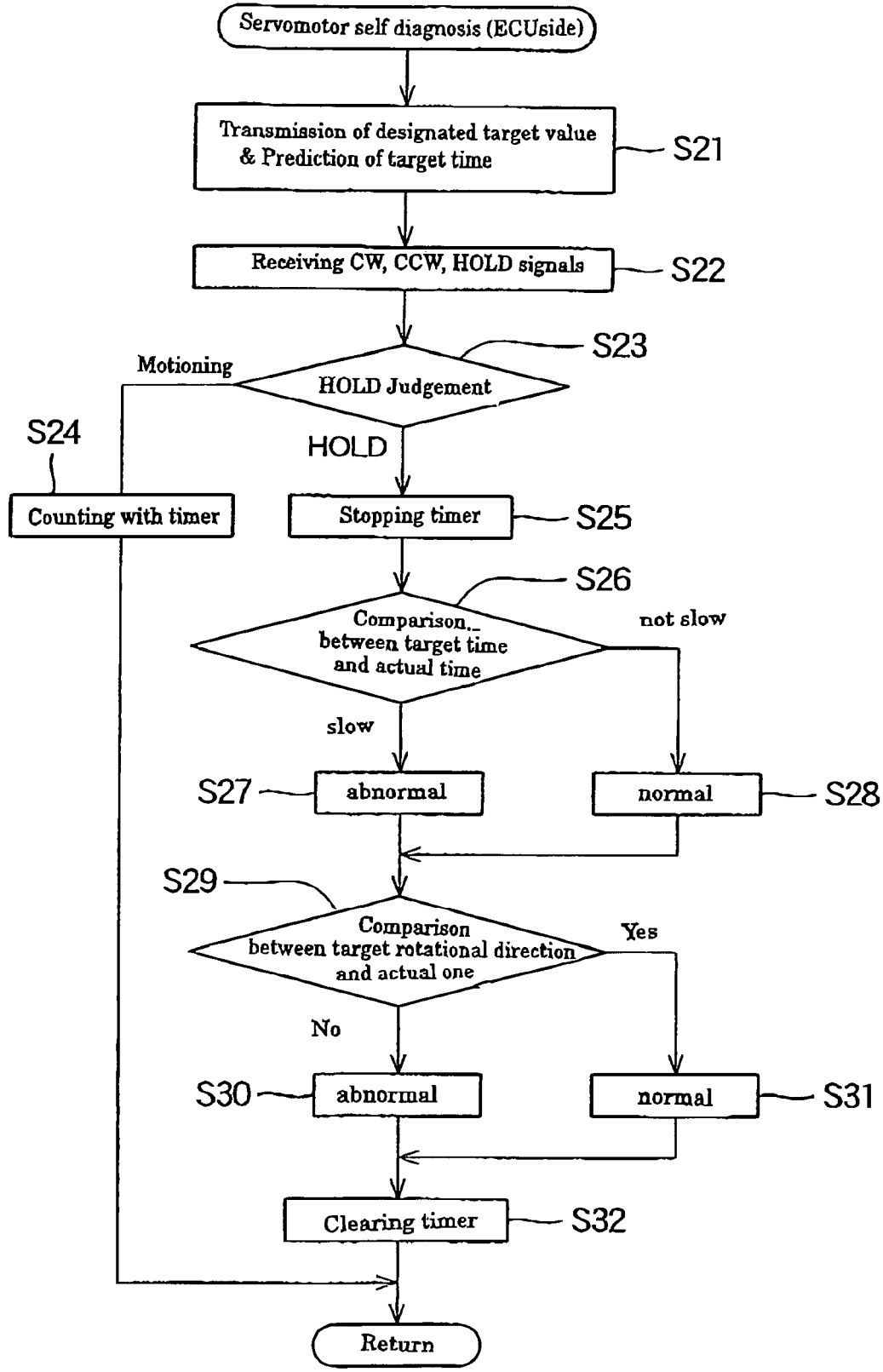
FIG. 12 is a flow chart showing a diagnosing operation of the servomotor controller based on an operating time in which the open degree of the door reaches a target indication value.

FIG. 12 is a flow chart showing the diagnosing operation of the servomotor controller based on the operating time period during which the door open degree reaches the designated target value. The controller 100 transmits the designated target value to the servomotor control circuit 40, and predicts a target time period during which the open degree reaches the designated target value (Step 21). Then, the controller 100 receives the CW signal or the CCW signal indicating the rotating direction of the motor and the HOLD signal indicating the stoppage of the motion of the motor (Step 22). The controller 100 makes HOLD judgment at Step 23, and continues to count a time with a timer at Step 24 if the motor is in motion. If the controller judges that the motor is in the HOLD state at Step 23, the controller stops the timer at Step 25. Next, the controller 100 compares a target time period with an actual time period (actually operating time period) at Step 26, and judges that abnormality occurs in the servomotor control circuit 40 if the actual time period is longer than the target one (Step 27), whereas the controller judges that the servomotor control circuit 40 is in order if the actual time period is not longer than the target one (Step 28). Further, the controller 100 compares the target rotating direction with the actual one (actually rotating direction), and judges that there is abnormality if both are in no conformity with each other (Step 30), whereas it judges that the operation is normal if they are in conformity (Step 31). And, the controller clears the timer at Step 32 (stops counting the time).

Figure 13:
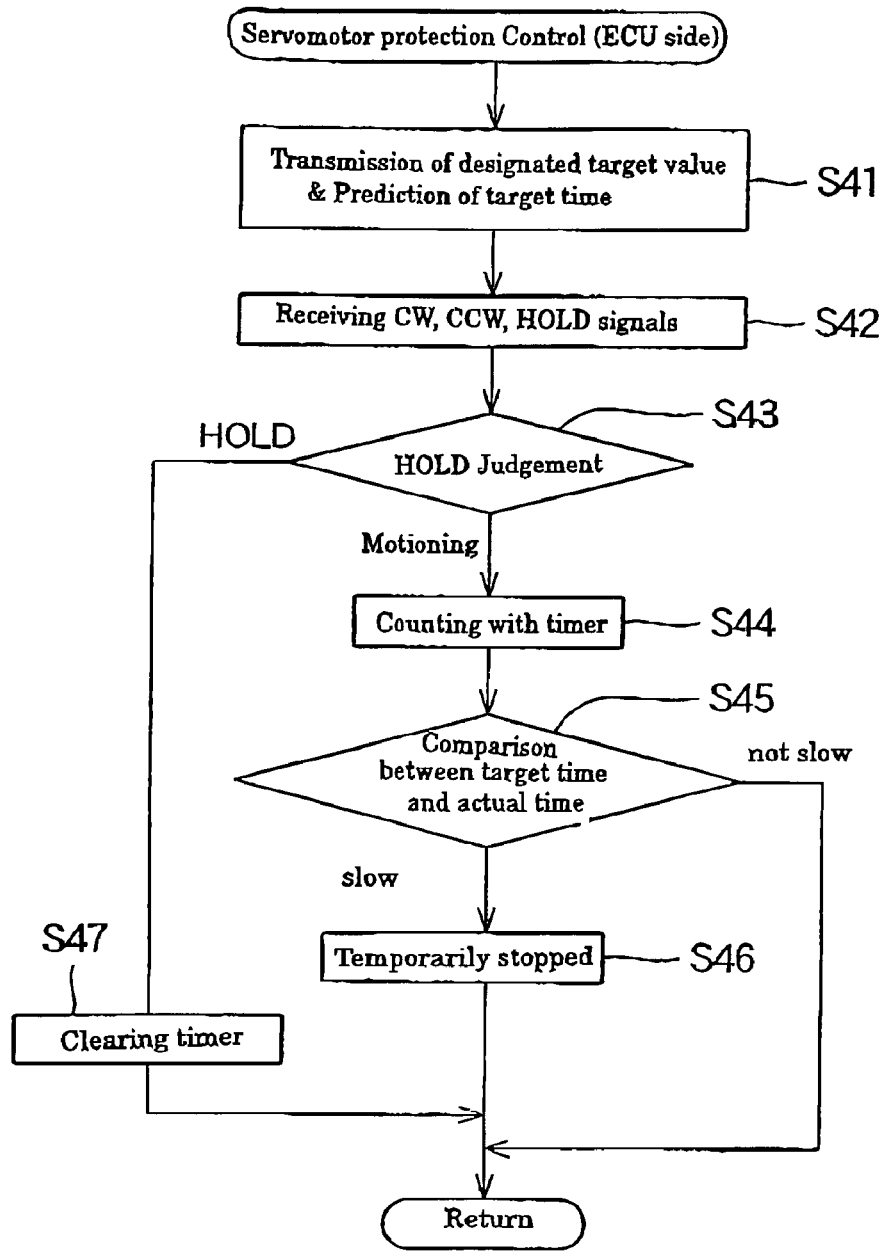
FIG. 13 is a flow chart a flow chart showing a protective operation of the servomotor controller based on an operating time in which the open degree of the door reaches a target indication value.

FIG. 13 is a flow chart showing the protecting operation of the servomotor controller based on the operating time during which the door open degree reaches the designated target value. The controller 100 transmits the designated target value to the servomotor control circuit 40, and predicts the target time period during which the open degree reaches the designated target value (Step 41). Then, the controller 100 receives the CW signal or the CCW signal indicating the rotating direction of the motor and the HOLD signal indicating the stoppage of the motion of the motor (Step 42). The controller 100 makes HOLD judgment at Step 43, and continues to count time with a timer at Step 44. If the controller judges that the motor is in the HOLD state at Step 23, the controller stops the time at Step 25. Next, the controller 100 compares a target time period with an actual time period (actually operating time period). If the actual time period is longer than the target one, the controller 100 stops the operation of the servomotor control circuit 40 for a given time period (Step 46), whereas the controller judges that the servomotor control circuit 40 is in order if the actual time period is not longer than the target one (Step 28). Further, the controller 100 compares the target rotating directions with the actual one (actually rotating direction), and judges that there is abnormality if both are in no coincidence with each other (Step 30), whereas it judges that the operation is normal if they are in coincidence (Step 31). If the controller 100 judges that the HOLD state at Step 43 in which the door open degree reaches the designated target value and the servomotor control circuit 40 stops its operation, the controller clears the timer at Step 32 (stops counting the time) at Step 47.

FIGS. 14(a) and 14(b) are figures showing application of the servomotor control IC of the servomotor controller according to the present invention to other uses. FIG. 14(a) is an example in which a temperature sensor is constituted by the servomotor control IC, and FIG. 14(b) shows an example in which an illumination (brightness) sensor is constituted by the servomotor control IC.

Since the servomotor control IC 40 has an A/D converting function and a function for transmitting A/D converted results, various sensors can be constituted by using this servomotor control IC 40. For example, as shown in FIG. 14(a), the temperature sensor can be constructed in such a manner that a resistor A and a thermister TH are connected in series between the output terminal VR of the stabilized power source Vref and the grounded potential, and potential generated in the thermister TH is fed to an analog voltage input terminal Vpbr. On the other hand, as shown in FIG. 14(b), the illumination (brightness) sensor can be constructed in such a manner that a resistor RB and a photodiode PD are connected in series between the output terminal VR of the stabilized power source Vref and the grounded potential, potential generated in the photodiode PD is fed to the analog voltage input terminal Vpbr. Outputs are taken out from the sensor as serial data via the input/output terminal Vbus for the serial communication signals. Likewise, a pressure sensor can be constructed by using a pressure-sensitive resistor element, etc. A magnetic sensor can be constructed by using a magnetic resistor element, etc.

In the above embodiment, it is described that the open degrees of the various doors in the automobile air conditioner are controlled by using the servomotor, but the servomotor controller according to the present invention can be applied to various uses including not only the door actuators but also actuators by which objects to be controlled are moved linearly.

Any combination of Countermeasure 1 and Countermeasure 2 of the present invention are also embodiments falling in the invention, unless contradictory to the claimed invention.

What is claimed is:

1. A servomotor controller for driving an electric motor type actuator having an electric motor comprising:
   a serial data-communication section;
   a receiving processing section for receiving information to a self address fed from a higher level unit via the serial data-communication section;
   an actuator driving-controlling section for performing a feedback control of a position of an object to be controlled (hereinafter referred to as control object) by driving said electric motor type actuator in order for the position of the control object to be a target value based on the target value of the control object included in the received information and a present position detected by a position detecting section, said present position having a present positional value;
   an operation inhibiting device to inhibit an operation of said actuator driving-controlling section after difference between said target value and said present positional value being in a previously set allowable range has been detected; and
   an operation permitting device to release a state that the operation of said actuator driving-controlling section is inhibited based on a forced operation request included in the received information.

2. The servomotor controller set forth in claim 1, wherein said forced operation request is set by at least one bit data or complex data of more than 1 bit.

3. The servomotor controller set forth in claim 1, wherein said control object is an air-conditioning unit for an automobile, said air-conditioning unit comprising plural kinds of blowout openings, a plurality of doors for said plural kinds of the blowout openings, respectively, said servomotor controller comprising plural actuator units for said doors, respectively, each of the door actuator units comprises an electric motor type actuator, a potentiometer for detecting the position of the door, and a servomotor control circuit, said servomotor control circuit comprising said serial data-communicating section, said receiving processing section, said actuator driving-controlling section, said operation inhibiting device, and said operation permitting device.

4. The servomotor controller set forth in claim 1, wherein the servomotor controller comprises an A/D converter for converting to n-bit present positional data a voltage fed from a position detecting section and corresponding to a present position of an object to be controlled; the actuator driving-controlling section is adapted for driving the motor actuator based on a deviation between n-bit target value data contained in the information received and the n-bit present positional data such that a position of the abject may take a target value; and a transmitting section for transmitting the present positional data of a same bit number (n-bit) as that of the target value data via the serial data communicating section in response to a transmitting request contained in the information received.

5. The servomotor controller set forth in claim 1, wherein the servomotor controller comprises an A/D converter for converting to present positional data a voltage fed from a position detecting section and corresponding to a present position of an object to be controlled; the actuator driving-controlling section is adapted for judging a rotating direction of a motor and driving or stoppage of the motor based on a deviation between target value data contained in the information received and the present positional data and driving the motor actuator based on a result of the judgment such that a position of the object may reach a target value; and a transmitting section for transmitting information on the rotating direction of the motor and information on the driving and stoppage of the motor at present via the serial data communicating section in response to a transmitting request contained in the information received.

6. The servomotor controller set forth in claim 1, wherein the servomotor controller comprises an A/D converter is adapted for converting to n-bit present positional data a voltage fed from a position detecting section and corresponding to a present position of an object to be controlled, an actuator driving-controlling section for judging a rotating direction of a motor and driving or stoppage of the motor based on a deviation between n-bit control target value data contained in the information received and the n-bit present positional data and driving the motor actuator based on a result of the judgment such that a position of the object may take a control target value; and a transmitting section for transmitting information on said present positional data and said rotating direction of the motor and the present driving and stoppage of the motor via the serial data communicating section, in response to a transmitting request contained in the information received.

7. A servomotor controller comprising:
   a serial data-communicating section;
   a receiving processing section for receiving information to a self address fed from a higher level unit via the serial data-communicating section;
   an A/D converter for converting to n-bit present positional data a voltage fed from a position detecting section and corresponding to a present position of an object to be controlled (hereinafter referred to as control object);
   an actuator driving-controlling section for driving a motor type actuator based on a deviation between n-bit target value data contained in the information received and the n-bit present positional data such that a position of the control object may take a target value; and
   a transmitting section for transmitting the present positional data of a same bit number (n-bit) as that of the target value data via the serial data communicating section in response to a transmitting request contained in the information received;

wherein said control object is an air-conditioning unit for an automobile, said air-conditioning unit comprising plural kinds of blowout openings, a plurality of doors for said plural kinds of the blowout openings, respectively, said servomotor controller comprising plural actuator units for said doors, respectively, each of the door actuator units comprises an electric motor type actuator, a potentiometer for detecting the position of the door and a servomotor control circuit, said servomotor control circuit comprising said receiving processing section, said A/D converter, said actuator driving controlling section and said transmitting section.

8. A servomotor controller comprising:

a serial data-communicating section;

a receiving processing section for receiving information to a self address fed from a higher level unit via the serial data-communicating section;

an A/D converter for converting to present positional data a voltage fed from a position detecting section and corresponding to a present position of an object to be controlled;

an actuator driving-controlling section for judging a rotating direction of a motor and driving or stoppage of the motor based on a deviation between target value data contained in the information received and the present positional data and driving the motor actuator based on a result of the judgment such that a position of the control object may reach a target value;

and a transmitting section for transmitting information on the rotating direction of the motor and information on the driving and stoppage of the motor at present via the serial data communicating section in response to a transmitting request contained in the information received.

9. The servomotor controller set forth in claim 8, wherein said control object is an air-conditioning unit for an automobile, said air-conditioning unit comprising plural kinds of blowout openings, a plurality of doors for said plural kinds of the blowout openings, respectively, said servomotor controller comprising plural actuator units for said doors, respectively, each of the door actuator units comprises an electric motor type actuator, a potentiometer for detecting the position of the door and a servomotor control circuit, said servomotor control circuit comprising said receiving processing section, said A/D converter, said actuator driving controlling section and said transmitting section.

10. A servomotor controller comprising:

a serial data-communicating section;

a receiving processing section for receiving information to a self address fed from a higher level unit via the serial data-communicating section;

an A/D converter for converting to n-bit present positional data a voltage fed from a position detecting section and corresponding to a present position of an object to be controlled, an actuator driving-controlling section for judging a rotating direction of a motor and driving or stoppage of the motor based on a deviation between n-bit control target value data contained in the information received and the n-bit present positional data and driving the motor actuator based on a result of the judgment such that a position of the control object may take a control target value; and a transmitting section for transmitting information on said present positional data and said rotating direction of the motor and the present driving and stoppage of the motor via the serial data communicating section, in response to a transmitting request contained in the information received.

11. The servomotor controller set forth in claim 10, wherein said control object is an air-conditioning unit for an automobile, said air-conditioning unit comprising plural kinds of blowout openings, a plurality of doors for said plural kinds of the blowout openings, respectively, said servomotor controller comprising plural actuator units for said doors, respectively, each of the door actuator units comprises an electric motor type actuator, a potentiometer for detecting the position of the door and a servomotor control circuit, said servomotor control circuit comprising said receiving processing section, said A/D converter, said actuator driving controlling section and said transmitting section.

12. A servomotor controller comprising:

a serial data-communicating section;

a receiving processing section for receiving information to a self address fed from a higher level unit via the serial data-communicating section;

an A/D converter for converting to n-bit present positional data a voltage fed from a position detecting section and corresponding to a present position of an object to be controlled (hereinafter referred to as control object):

an actuator driving-controlling section for driving a motor type actuator based on a deviation between n-bit target value data contained in the information received and the n-bit present positional data such that a position of the control object may take a target value;

a transmitting section for transmitting the present positional data of a same bit number (n-bit) as that of the target value data via the serial data communicating section in response to a transmitting request contained in the information received; and an operation inhibiting device to inhibit an operation of said actuator driving-controlling section after difference between said target value and said present value being in a previously set allowable range has been detected; and an operation permitting device to release a state that the operation of said actuator driving-controlling section is inhibited based on a forced operation request included in the received information.

13. The servomotor controller set forth in claim 8, which further comprises an operation inhibiting device to inhibit an operation of said actuator driving-controlling section after difference between said target value and said present positional data being in a previously set allowable range has been detected; and an operation permitting device to release a state that the operation of said actuator driving-controlling section is inhibited based on a forced operation request included in the received information.

14. The servomotor controller set forth in claim 10, which further comprises an operation inhibiting device to inhibit an operation of said actuator driving-controlling section after difference between said target value and said present positional value being in a previously set allowable range has been detected; and an operation permitting device to release a state that the operation of said actuator driving-controlling section is inhibited based on a forced operation request included in the received information.

* * * * *